US011731651B2

(12) United States Patent
Lin et al.

(10) Patent No.: US 11,731,651 B2
(45) Date of Patent: Aug. 22, 2023

(54) AUTOMATIC PARAMETER TUNING FRAMEWORK FOR CONTROLLERS USED IN AUTONOMOUS DRIVING VEHICLES

(71) Applicant: Baidu USA LLC, Sunnyvale, CA (US)

(72) Inventors: Weiman Lin, Sunnyvale, CA (US); Yu Cao, Sunnyvale, CA (US); Yu Wang, Sunnyvale, CA (US); Qi Luo, Sunnyvale, CA (US); Shu Jiang, Sunnyvale, CA (US); Xiangquan Xiao, Sunnyvale, CA (US); Longtao Lin, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 184 days.

(21) Appl. No.: 17/039,685

(22) Filed: Sep. 30, 2020

(65) Prior Publication Data

US 2022/0097728 A1   Mar. 31, 2022

(51) Int. Cl.
| | |
|---|---|
| *B60W 10/04* | (2006.01) |
| *B60W 60/00* | (2020.01) |
| *G01C 21/34* | (2006.01) |
| *B60W 30/18* | (2012.01) |
| *B60W 10/18* | (2012.01) |
| *B60W 10/20* | (2006.01) |

(52) U.S. Cl.
CPC ........ *B60W 60/0011* (2020.02); *B60W 10/04* (2013.01); *B60W 10/18* (2013.01); *B60W 10/20* (2013.01); *B60W 30/18009* (2013.01); *G01C 21/3453* (2013.01)

(58) Field of Classification Search
CPC .. B60W 60/0011; B60W 10/04; B60W 10/18; B60W 10/20; B60W 30/18009; B60W 2050/0018; B60W 2050/0088; G01C 21/3453; G06F 30/20; G06N 20/00
USPC .......................................................... 701/25
See application file for complete search history.

(56) References Cited

U.S. PATENT DOCUMENTS 10,579,063 B2 * 3/2020 Haynes ................. G01C 21/20
11,016,500 B2 * 5/2021 Zhang ................... B60W 50/06
(Continued)

*Primary Examiner* — Jonathan M Dager
*Assistant Examiner* — Jean W Charleston
(74) *Attorney, Agent, or Firm* — Womble Bond Dickinson (US) LLP

(57) ABSTRACT

Systems and methods are disclosed for optimizing values of a set of tunable parameters of an autonomous driving vehicle (ADV). The controllers can be a linear quadratic regular, a "bicycle model," a model-reference adaptive controller (MRAC) that reduces actuation latency in control subsystems such as steering, braking, and throttle, or other controller ("controllers"). An optimizer selects a set tunable parameters for the controllers. A task distribution system pairs each set of parameters with each of a plurality of simulated driving scenarios, and dispatches a task to the simulator to perform the simulation with the set of parameters. Each simulation is scored. A weighted score is generated from the simulation. The optimizer uses the weighted score as a target objective for a next iteration of the optimizer, for a fixed number of iterations. A physical real-world ADV is navigated using the optimized set of parameters for the controllers in the ADV.

20 Claims, 14 Drawing Sheets

(56) References Cited

U.S. PATENT DOCUMENTS

| | | | |
|---|---|---|---|
| 2011/0190933 A1* | 8/2011 | Shein | B62D 55/075 |
| | | | 901/1 |
| 2018/0307233 A1* | 10/2018 | Zhu | G01C 21/3415 |
| 2018/0326956 A1* | 11/2018 | Zhu | B60T 8/00 |
| 2018/0330173 A1* | 11/2018 | Zhu | B60W 10/184 |
| 2018/0348763 A1* | 12/2018 | Jiang | G05D 1/0088 |
| 2018/0348775 A1* | 12/2018 | Yu | B60W 30/1882 |
| 2018/0364657 A1* | 12/2018 | Luo | G05D 1/0221 |
| 2019/0329771 A1* | 10/2019 | Wray | B60W 30/18163 |
| 2020/0278686 A1* | 9/2020 | Liu | G05B 17/02 |
| 2021/0237772 A1* | 8/2021 | Meltz | B60W 30/08 |
| 2021/0375129 A1* | 12/2021 | Meng | G08G 1/082 |
| 2021/0403036 A1* | 12/2021 | Danna | G06F 16/2457 |

* cited by examiner

400

| Application 401 | Planning and Control 402 | Perception 403 | Device Driver(s) 404 | Firmware 405 | Hardware 406 |

FIG. 4

AUTOMATIC PARAMETER TUNING FRAMEWORK FOR CONTROLLERS USED IN AUTONOMOUS DRIVING VEHICLES

TECHNICAL FIELD

Embodiments of the present disclosure relate generally to operating autonomous vehicles. More particularly, embodiments of the disclosure relate to an efficient, real-time process for optimizing control parameters for one or more tunable controllers of an autonomous vehicle, to improve autonomous vehicle control.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed (first order dynamics), without considering the second order dynamics of control subsystems, such as brakes, throttle, and steering.

When deploying a controller system for an autonomous driving vehicle, it is essential that the controller system design parameters are specific to the particular autonomous driving vehicle so that the autonomous driving vehicle moves as instructed. However, there are a vast number of controller design parameters that must be determined and whose values must be tuned for best controller performance. It is a substantial challenge to efficiently find an optimal set of controller parameter values capable of being used in a various driving scenarios.

In the prior art, a controller's parameters may be tuned by either human observers or a brute-force search using grid-search algorithms. Sole dependency on human experience may not guarantee an optimal set of parameters for the controller, while brute-force searches using grid-search algorithms in a parameter configuration space may introduce substantial computational cost.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating architecture of an autonomous driving system according to one embodiment.

DETAILED DESCRIPTION

Figure 1:
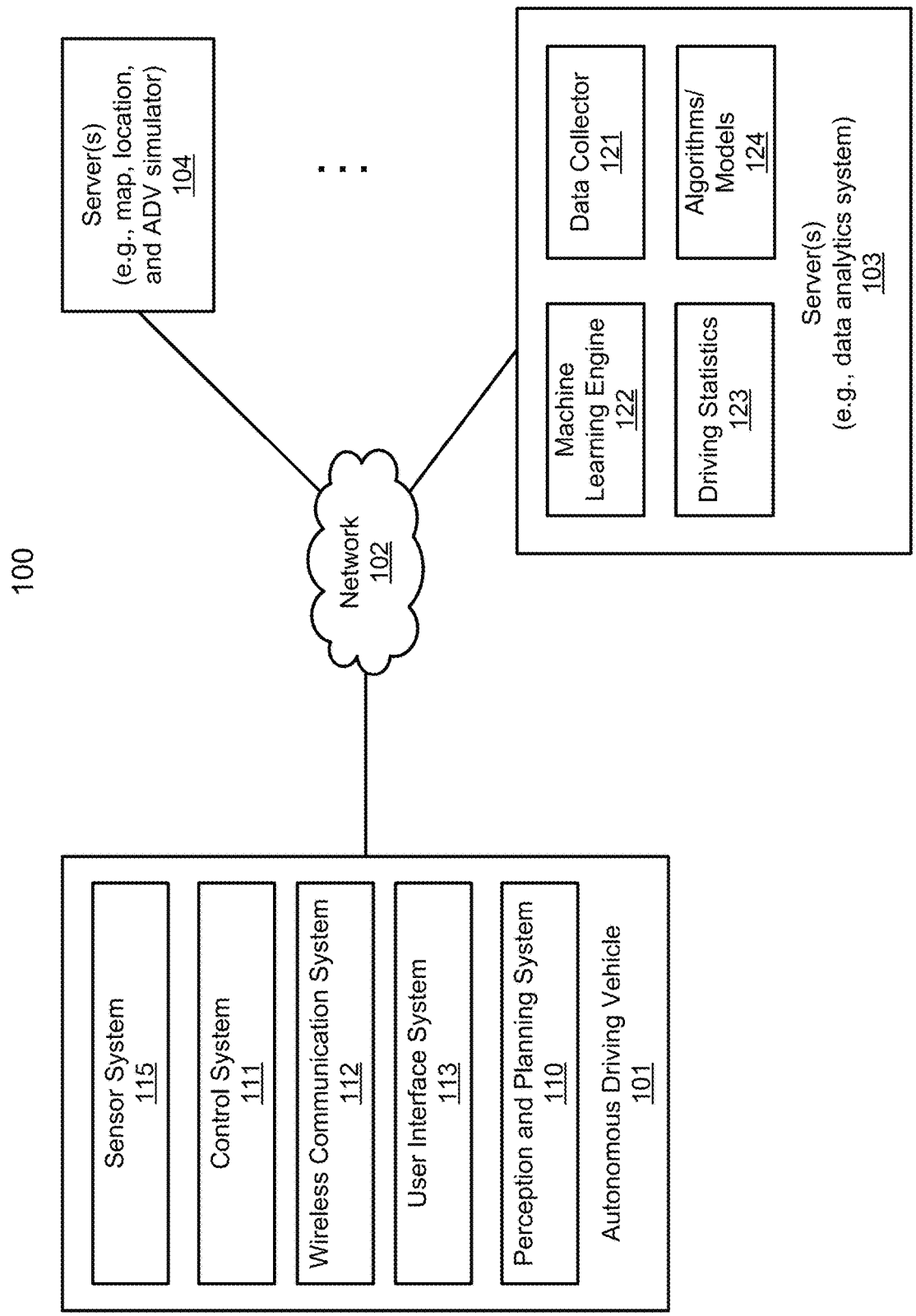
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In an embodiment, a computer-implemented method of automatic tuning of one or more controllers of an autonomous driving vehicle (ADV) control system includes generating, by an optimizer, a first value for each parameter of a plurality of tunable parameters of one or more controllers of an ADV. In an embodiment, the optimizer can be a Bayesian Global Optimizer. The Bayesian Global Optimizer can utilize multiple surrogate models which are the probability models for approximating the objecting function, including Gaussian Process Regress (GPR) and Tree-structured Parzen Estimator (TPE), and the like. For each of a plurality of driving scenarios: a simulation of the driving scenario is run using the first value for each of the plurality of tunable parameters to control the one or more controllers; a score is generated of the simulation of the driving scenario indicating a level of performance of the one or more controllers during the simulation of the driving scenario; and a first weighted score is computed from the scores generated for the simulation of each of the plurality of driving scenarios. The values of the plurality of tunable parameters are optimized by repeating the preceding operations, using the resulting first weighted score of each repetition as an objective for the optimizer and using the resulting first weighted score to generate a second value for each of the plurality of tunable parameters. The preceding operations are repeated until a predetermined fixed number of repetitions have been performed. Then the optimized values for the plurality of tunable parameters are incorporated into the one of more controllers of a physical real-world ADV, and the ADV is navigated using the one or more controllers. In an embodiment, in a first iteration of the preceding operations, the first value for each of the plurality of tunable control parameters is selected randomly. In an embodiment, a second independent instance of the preceding operations, having different first values from the first values for the plurality of tunable parameters, is run in parallel with the first instance of the operations. The second independent instance of operations are repeated until a second weighted score differs from the first weighted score of a previous iteration of the operations by less than a predetermined threshold amount. The plurality of tunable parameters can include: a time constant parameter and an adaptive gain parameter for a model-reference adaptive gain controller (MRAC) that optimizes actuation of steering, braking and throttle control subsystems of the ADV. The plurality of tunable parameters can further include a plurality of lateral dynamics parameters in a state weighting matrix of a linear quadratic regulator (LQR) of the ADV. In an embodiment, the plurality of tunable parameters can include: a low-speed and a high-speed proportional gain parameter; a low-speed and a high-speed integral gain parameter; and a station error parameter. In an embodiment, driving scenarios, of the plurality of driving scenarios, can include: a left turn at high speed; a left turn at low speed; a right turn at high speed; a right turn at low speed; a U-turn at high speed; a U-turn at low speed; and a serpentine-shape successive side-pass. A serpentine-shape successive side-pass refers to a driving scenario wherein the autonomous driving vehicle (ADV) is following another vehicle in a first lane, and the ADV overtakes and passes the another vehicle using a second lane (either on the right or the left of the another vehicle), and the ADV returns to the first lane. The shape of the ADV driving path, when viewed from above, is serpentine-shaped. The passing of the another vehicle is successive in that the ADV makes a first lane change into the second lane, followed by the ADV overtaking (passing) the another vehicle, then the ADV making another lane change back to the first lane. In an embodiment, generating the first and second weighted scores are each calculated using a weighting profile that can include: a weight for a heading error is higher than a weighting for speed error; and a weight for ending station error is higher than a weighting for ending lateral error.

In an embodiment, any/all of the above method functionality can be implemented by a processing system, comprising one or more hardware processors coupled to a memory programmed with executable instructions that, when executed by the processing system, cause a computing system to implement the claimed functionality. In an embodiment, the memory can be a non-transitory computer-readable medium or other type of memory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, simulated autonomous vehicle driving servers, or location servers, etc. An autonomous vehicle driving simulator server 104 can include data logging of driving records substantially identical to the data logging of a real autonomous driving vehicle. The driving simulator can be used to test proposed updates to autonomous vehicle control systems. The driving simulator can upload its driving records for processing by, e.g., server 103 algorithms 124 to generate a set of standardized metrics 124 that characterize performance of the autonomous vehicle control system. The driving simulator can simulate actual driving of one or more types of ADVs. A type of ADV can include a compact ADV, a sport utility vehicle (SUV), a truck, a van, or other physical type of ADV. Autonomous driving for each type of ADV can be controlled by one or more controllers or subsystem controllers. The driving simulator can implement the ADV controllers using a same, or similar, logic as in the physical real-world ADVs. A controller of the ADV can include logic to execute a portion of a planned vehicle path, guiding the ADV along the planned vehicle path by controlling control subsystems such as steering, braking, and throttle. Each controller or subsystem controller (collectively, "controllers") can include one or more tunable parameters that affect operation of the ADV having the ADV type. Controllers, include dynamic controllers such as a linear quadratic regulator (LQR), or other dynamic controller (e.g. "bicycle model"). Subsystem controllers, include a model-reference adaptive controller (MRAC) that optimizes actuation of a subsystem, e.g. steering, brakes, and throttle, in view of latency in the subsystem actuator(s). In an embodiment, each subsystem actuator can have its own instance of an MRAC controller. Server 104 can have logic to implement an automatic parameter tuning frame work to tune values for tunable parameters of each controller or subsystem controller, using the driving simulator.

An autonomous vehicle 101 refers to a vehicle that can be configured to be driven in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. As described herein, in some embodiments, an autonomous vehicle is simulated in an autonomous driving simulator of server 104. Characteristics and identifiers, such as an autonomous vehicle type (e.g. Lexus®, Honda®, SmartCar®, Kia®, compact car, van, truck, SUV, et al.) and an autonomous vehicle controller type (e.g. model predictive control, or linear quadratic regulator (LQR)) can be used to simulate autonomous vehicles within an autonomous driving simulation system and driving records generated by a simulated autonomous vehicle driving session.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
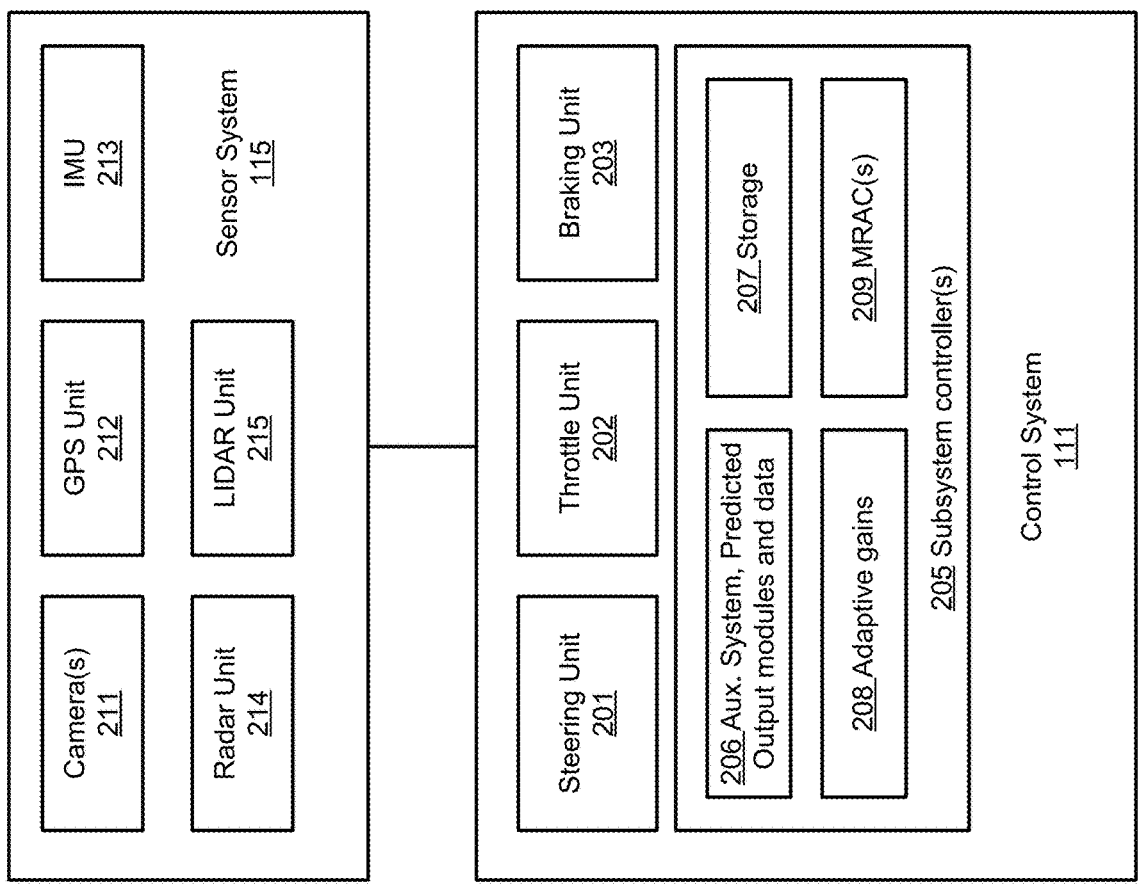
FIG. 2 is a block diagram illustrating an example a sensor system and a control system of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Control system 111 may further comprise subsystem controllers 205. Subsystem controllers 205 can include a controller for the steering unit 201, a controller for the throttle unit 202, and a controller for the braking unit 203. Each subsystem controller 205 receives one or more control commands from the ADV control system 111. As described with reference to FIG. 3C, below, the ADV control system 111 receives a trajectory path for the ADV to follow to navigate a portion of an ADV route. The control system 111 can determine an amount of steering, braking, and/or throttling that is needed to navigate the ADV along the trajectory path. Control system 111 then issues one or more commands to one or more control subsystems (steering unit 201, throttle unit 202, braking unit 203). A steering command can be in the form of a target steering angle, e.g. to the left or right of straight ahead, expressed in degrees or radians. A throttle command from the control system 111 to the throttle unit 202 can be e.g. a target speed, acceleration, or percentage of full throttle. A braking command from the control system 111 to the braking unit 203 can be, e.g. a target speed, a deceleration rate, or a percentage of full braking. Each control command from control system 111 to a control subsystem (steering unit 102, throttle 202, or braking 203) can be translated into a physical action on the control subsystem by a controller within the subsystem.

The physical actuation by a control subsystem of a command received from the control system 111 is not immediate. A time-latency in physical actuation represents a difference between a time issuing of a command from the controller 111 and the time that the subsystem controller outputs a command to begin the physic actuation. After execution of the command begins by the subsystem controller, dynamic delays exist in executing the command to attain the physical target actuation commanded by the controller 111. The systems and methods described herein compensate for the time-latency and dynamic delays in physical actuation of the subsystem to improve the bandwidth of the control system 111. An example command from an ADV controller to a subsystem controller, and the resulting time-latency and actuation dynamics of the subsystem are described below with reference to FIG. 3C.

Subsystem controller(s) 205 can include storage for reference actuation outputs 206, storage 207 for e.g. parameters of the dynamic models, storage 208 for adaptive gains, and a one or more model reference adaptive controllers (MRAC) 209. In an embodiment, reference actuation outputs and/or predicted actuation outputs can be generated from a model or one or more algorithms and data. Reference ("auxiliary system") actuation outputs, predicted actuation outputs, and other data 206, adaptive gains 208, and MRACs 209 are described more fully, below, with reference to FIGS. 6A-6C.

Subsystem controllers 205 can be integrated with ADV controller 111 or as stand-alone subsystem controllers. In practice, subsystem controllers are often third-party controllers such that the ADV control system communicates with the subsystem actuators controller via a programming interface, and the specifics of how a command is executed and actuated by the control subsystem are a "black box" to the ADV controller designer. Compensating for the time-latency and actuation dynamic delays of a subsystem, as described herein, enable an ADV to adaptively account for time-latency and actuation dynamic delays of a subsystem without needing to know the cause or reason for the time-latency and actuation dynamic delays. Control subsystem time-latency and actuation dynamic delay are particularly important in driving scenarios that require rapid braking, accelerating, or steering. Note that the components as shown in FIG. 2 may be implemented in hardware, software, or a combination thereof. One or more time constants, and one or more adaptive gains values, of MRAC 209 can be tuned by an automatic parameter tuning parameter framework for controllers used in ADVs, as described below.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Autonomous driving vehicle (ADV) 101 can generate and log driving records that capture data from the subsystems, e.g. sensor system 115, control system 111, and perception and planning system 110. The driving records can be uploaded to a server, e.g. server 103, for storage by data collector 121. A cross-platform control profiling system, stored in e.g. server 103 algorithms and models 124, can analyze driving records from a large plurality of ADVs and simulated ADVs to generate driving Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a cross-platform control profiling system that generates a set of standardized statistics, or metrics, 123 characterizing performance of an autonomous driving control system of the ADV using ADV driving data and simulated ADV driving data ("cross-platform" meaning both real and simulated ADV driving records). Raw driving data records are uploaded from an ADV at a specified time, or manually, to date collector 121. Simulated ADV driving data is also uploaded to data collector 121. Algorithms 124 are used to generate the set of set of standardized metrics characterizing the performance of the ADV control system. The metrics are stored in driving statistics 123, and distributed to subscribing users, such as design engineers.

Figure 3A:
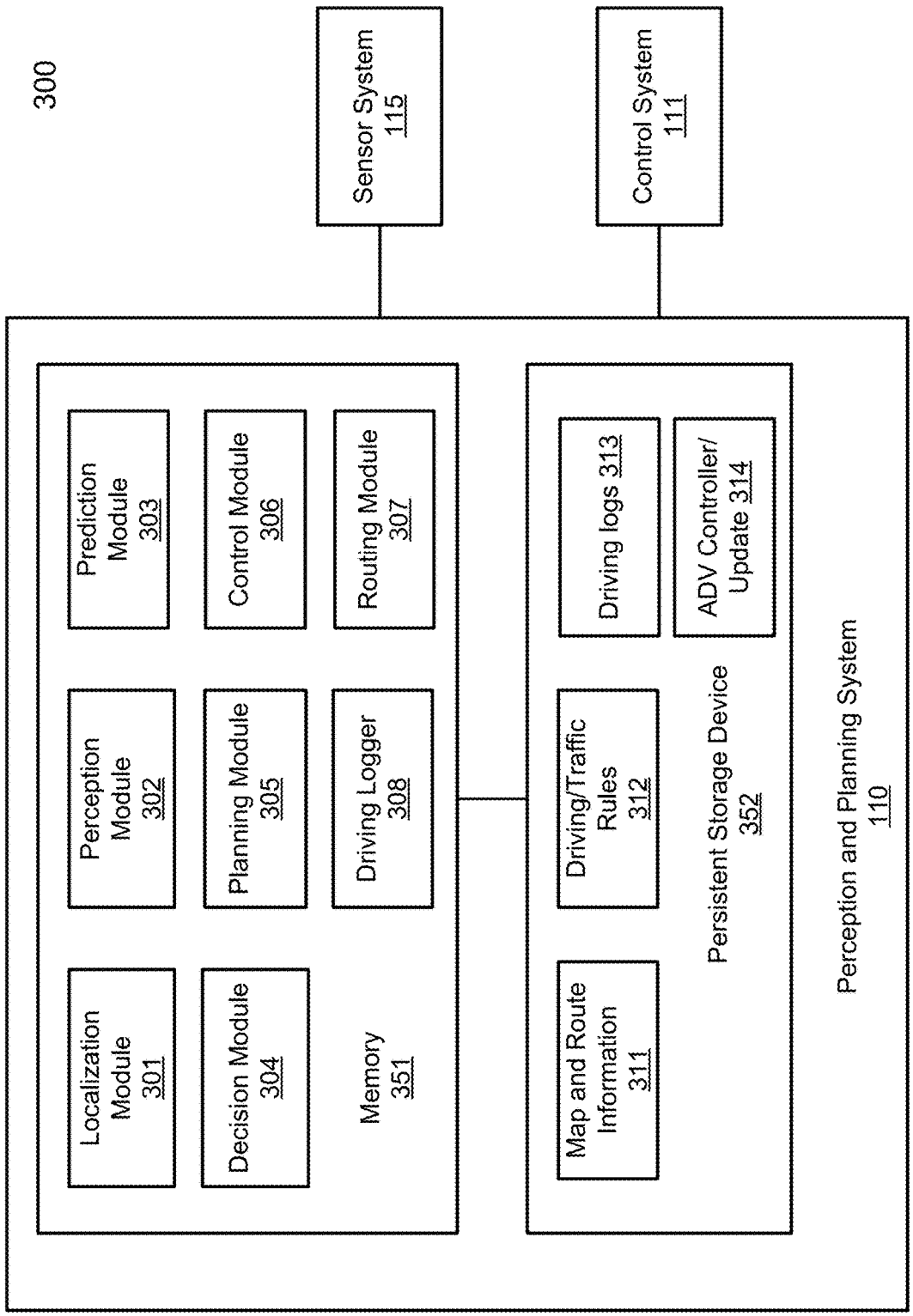
FIGS. 3A and 3B are block diagrams illustrating an example of a perception and planning system used with an autonomous vehicle according to one embodiment.
Figure 3B:
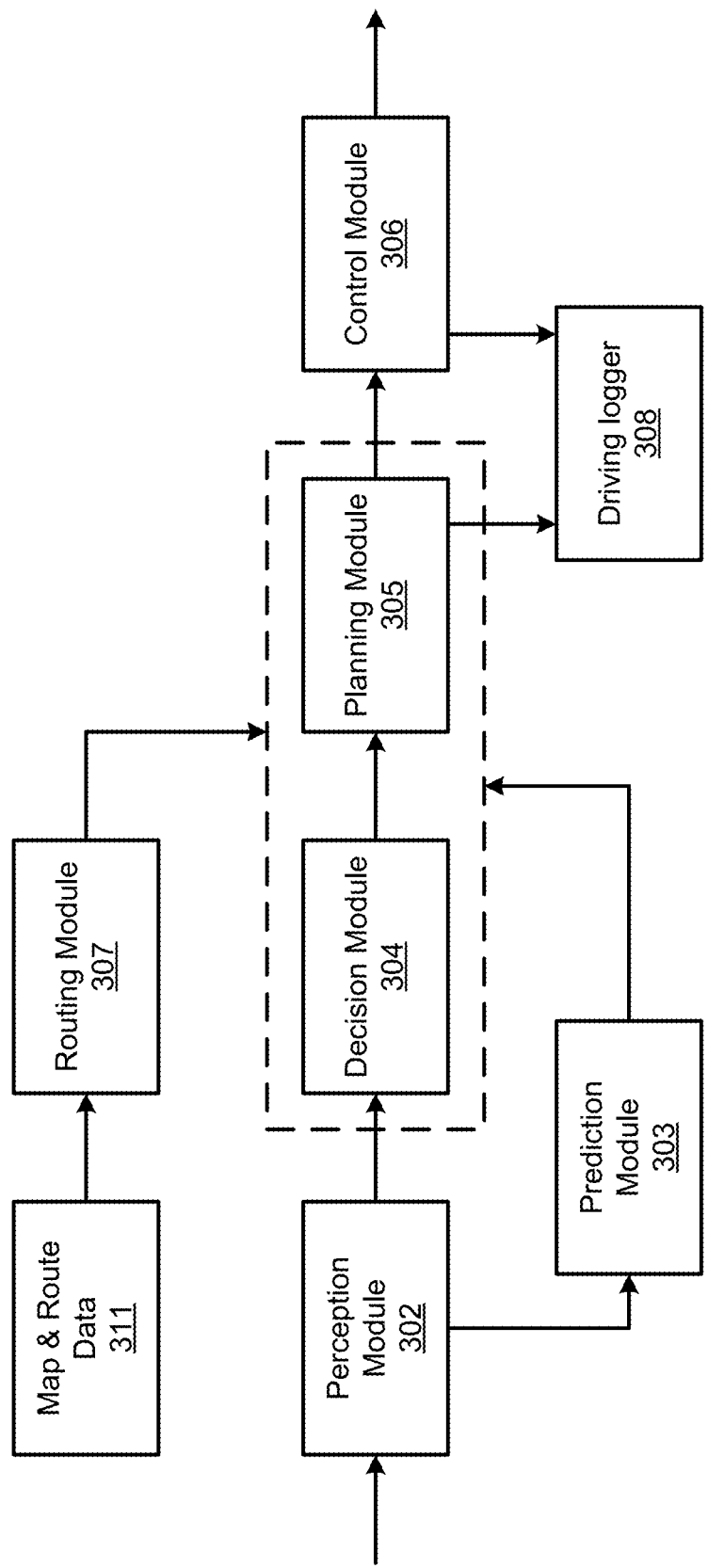

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and driving logger 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Driving logger 308 records driving records from at least three data channels of the ADV control system: the control channel, the chassis channel, and the localization channel. The control channel produces information about control commands to control systems of the ADV, such as braking, throttle, and steering. The chassis channel produces information from various sensors, such as accelerometers, and readings of actual positions or actuations of the braking, throttle, and steering systems. The localization channel produces information regarding the actual location and heading of the ADV with reference to a standard reference such as a high-definition (HD) map or a global positioning satellite (GPS) system. Data records can be recorded at approximately 100 frames per second (fps), or at about 10 milliseconds (ms) per frame. Each driving record has a timestamp. A timestamp can be an absolute timestamp in the form of hh:mm:ss:ms (hours, minutes, seconds, milliseconds) relative to a start time, such as the start of a driving route. In embodiment, the timestamp can be a frame number, relative to a start time such as the start of the driving route. In an embodiment, each driving record can additional have a date stamp in addition to the time stamp. Data logger 308 can log driving records for simulated ADV driving sessions as well as real-world ADV driving sessions.

Data logger 308 can write the driving records to a non-volatile storage such as driving logs storage 313. Driving logs 313 can be uploaded to a server system, e.g. server(s) 103-104, to generate a set of standardized performance metrics that grade the performance of a controller of the ADV. The controller of the ADV can be updated, by ADV Controller/Update 314, using the standardized set of metrics, and the updated controller of the ADV can be stored in persistent storage 352. The persistent storage 352 can further include logic and updates to the ADV controller.

As shown on FIG. 3B, data logger 308 can also receive driving records from the planning module. The planning module driving records can be used to compare planned driving conditions vs. actual (or simulated) driving conditions, to grade the performance of the ADV controller.

Figure 3C:
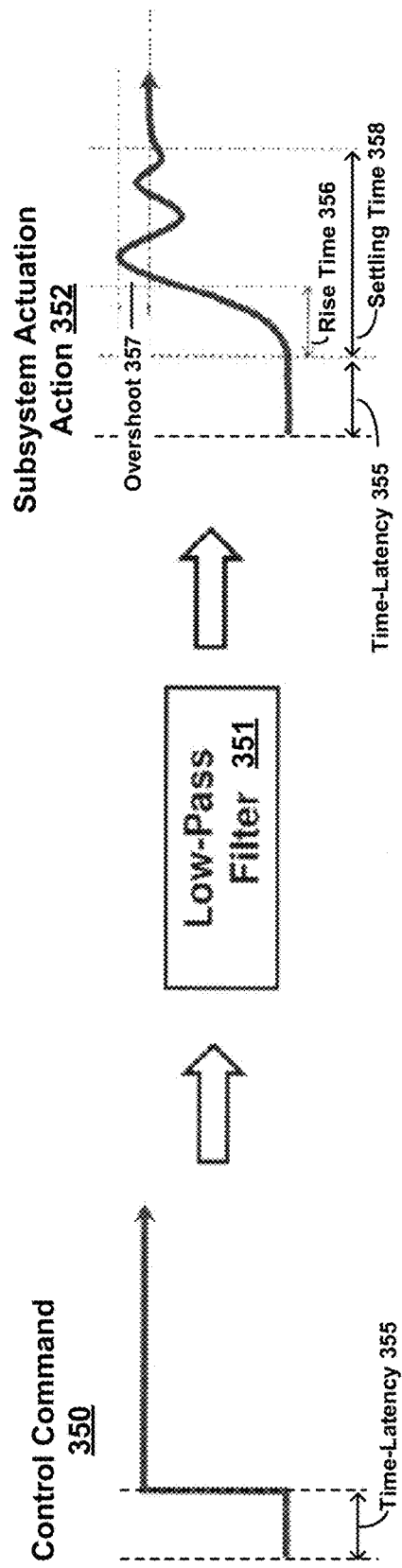
FIG. 3C illustrates an example autonomous vehicle control command and an autonomous vehicle control subsystem actuation action response to the control command, according to some an embodiment.

FIG. 3C illustrates an example ADV control command and an autonomous vehicle control subsystem actuation action response to the control command, according to an embodiment. A hypothetical example control command 350 is shown as a step function. In practice, control inputs typically are not step functions. However, the control input well-illustrates the concepts to be described herein. Control command 350 has a time-latency 355. The time-latency is a time between a control input given by ADV control system 111, given to an ADV control subsystem (e.g. throttle, steering, brakes), and the beginning of actuation of the control subsystem in response to the control input.

The control command 350 can be passed through a low-pass filter 351 before being passed to the subsystem actuation 352. ADV's are "drive-by-wire," meaning that the control subsystem actuation is via transmission of a control command. In practice, control subsystem actuators are often provided by third parties, different from the designers of the ADV or the ADV controller. Thus, the designer of the ADV or ADV controller is aware that there are actuation delays, such as rise time 356, overshoot 357, and rise time 356, and time-latency after an actuation command is received and before actuation begins, but the designer of the ADV or ADV controller does not know the exact sources of the actuation delays. To the ADV designer or ADV controller designer, the control subsystem actuator is merely a "black box," which has actuation delays in relation to input control commands. Systems and methods described herein can account for the actuation delays and time-latency using a reference actuation output, a predicted actuation output, a by-wire actuation output, adaptive gains, time-delay compensation, and time-latency compensation, and a closed loop subsystem controller.

Figure 3D:
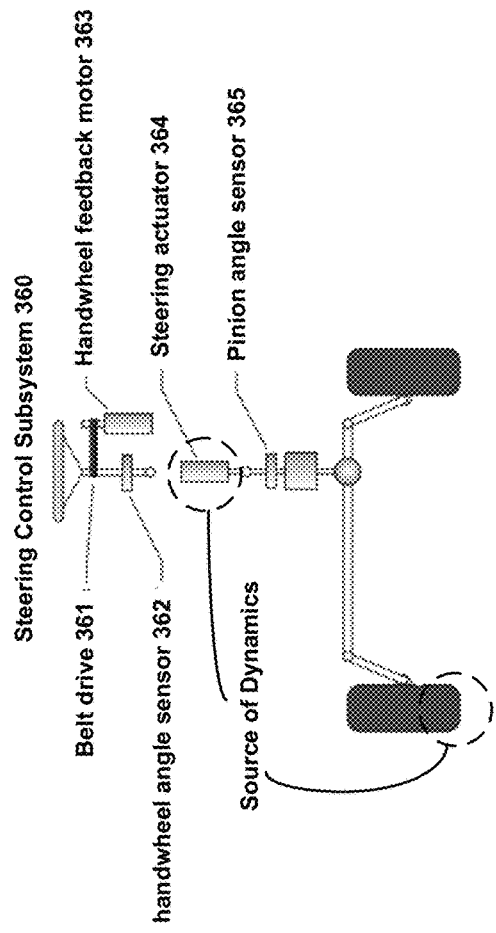
FIG. 3D illustrates a steering control subsystem as used in an autonomous vehicle, and sources of dynamics, according to an embodiment.

FIG. 3D illustrates a steering control subsystem as used in an autonomous vehicle, and sources of dynamics, according to an embodiment.

Steering control subsystem 360 is an example control subsystem of ADV 101. Steering subsystems in ADVs are typically "drive by wire" systems that receive a control command, e.g. control command 350, and execute the control command through physical and electronic means. Steering control subsystem 360 can include a belt drive 361, a hand wheel feedback motor 363, a hand wheel angle sensor 362, a steering actuator 364, a pinion angle sensor, and tires. Steering actuator 364, e.g., and tires, may introduce sources of actuation dynamic delay.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
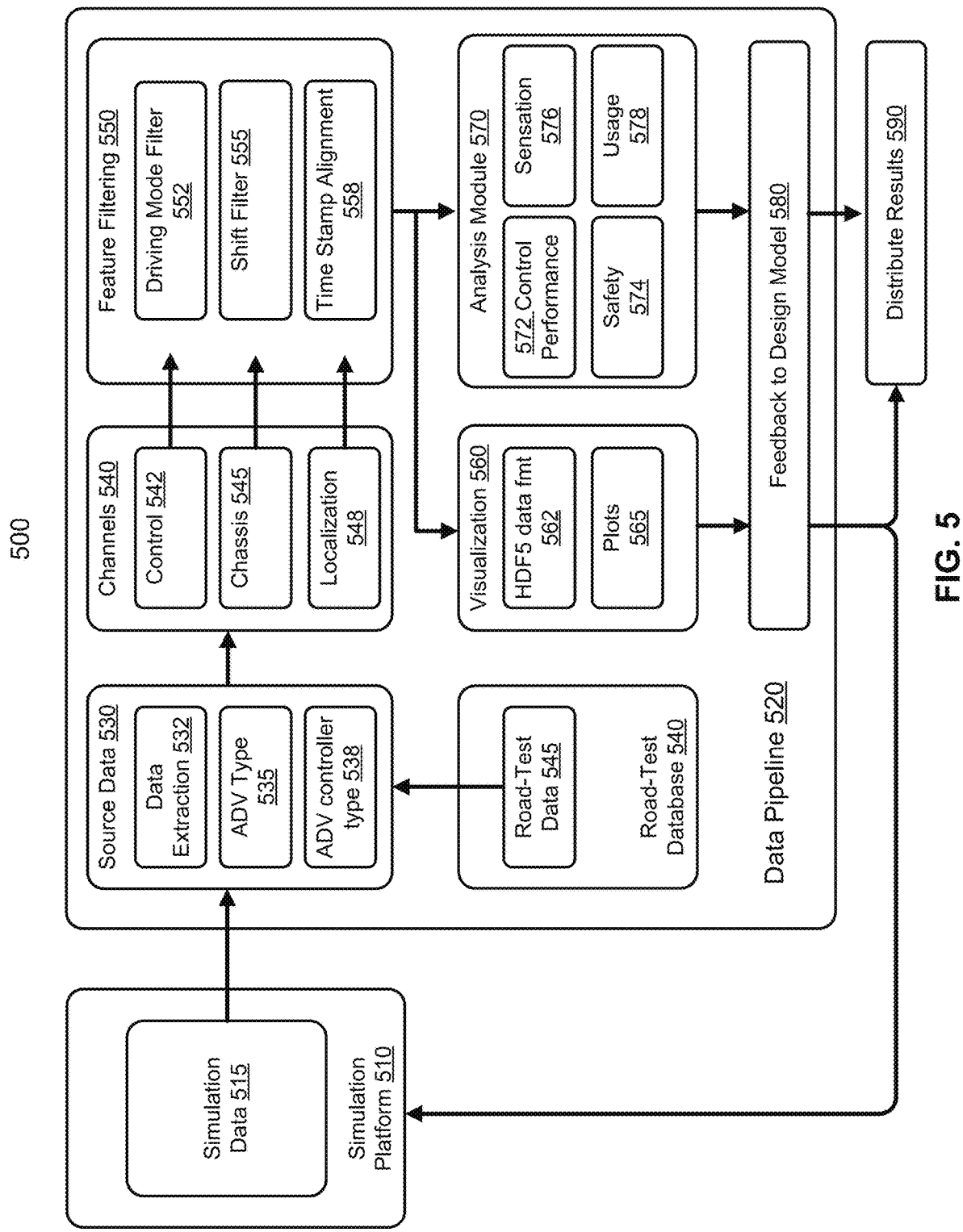
FIG. 5 is a block diagrams illustrating a data flow and a system that generates standardized performance metrics of an autonomous vehicle controller, for use in improving the autonomous vehicle controller, according to one embodiment.

FIG. 5 illustrates, in block diagram form, a cross-platform control profiling system 500 that generates performance metrics for grading the performance of a control system for an ADV, according to some embodiments. The cross-platform control profiling system 500 can be implemented on, e.g. servers 103-104.

A cross-platform control profiling system (or, "control profiling system") 500 can include a simulation platform 510 and a data pipeline 520. Simulation platform 510 can simulate driving a real-world ADV, including simulating driving of an ADV having an ADV type (e.g. a make, model, revision number of an ADV) and an ADV control system type (or "ADV controller type") of the ADV (e.g. model predictive control, linear quadratic regulator, or hybrid controller type). The ADV control system type can also have a model, hardware revision level, software revision level, build number, serial number, and other identifying information. A particular ADV controller type can be simulated within simulation platform 510 so that simulated driving can simulation produce data 515 driving records that are analogous to real-world ADV "road-test data" 545 driving records. Simulation data 515 can be generated by a driving session of a simulated ADV. The simulation data 515 can be uploaded to data pipeline 520 to generate a set of performance metrics that grade the performance of an ADV control system. In an embodiment, simulation data is automatically uploaded to data pipeline 520 at the end of a simulated driving session.

Data pipeline 520 can include source data 530, data channels 540, feature filtering 550, visualization 560, data analysis module 570, and analysis results distribution 580. Source data 530 can include simulation data 515 driving records and road-test data 545 driving records. Data extraction module 532 can receive selection criteria from a user interface, or from processing job instructions, or other manner of receiving driving data selection criteria. Data extraction 532 can extract driving records from received simulation data 515 and road-test data 545. Data extraction 532 can limit the records extracted to a particular ADV type 535 and a particular ADV controller type 538. An ADV vehicle type 535 can be a vehicle classification (compact, standard, full-size, sports utility vehicle (SUV), or truck) or a particular manufacturing brand, model, and year (e.g. Honda® Accord 2019). ADV type 535 can include other identifying information that may further identify physical attributes of the specific ADV, such as wheelbase, curb weight, turning radius, engine type (hybrid, electric, diesel, or gasoline), maximum turning angle, horsepower rating, and the like. ADV controller type 538 can include model predictive control (MPC), linear quadratic regulator (LQR), or a hybrid of these. ADV controller type 538 may further include hardware identifiers, software module identifiers, version information, and the like. Source data 530, extracted from simulation data 515 and road-test data 545, and selected based on ADV type 535 and ADV controller type 538, is passed to, and processed by, channels module 540.

Driving data records can be generated by an ADV or simulated ADV at a rate of, e.g. 100 frames per second (100 fps), or at approximate intervals of 10 milliseconds (ms). Driving data records can each have a timestamp that represents a sequential, monotonically increasing value from a start time. In an embodiment, the start time can be related to a real-time clock. In an embodiment, the start time can be related to a first time that the ADV or simulated ADV was powered on or started for a day. In an embodiment, the start time can be related to a start time of a driving session from a start location to an end location. The timestamp can have a granularity of at least 10 ms. In an embodiment, the timestamp can be a monotonically increasing positive integer value that represents a data frame number, as measured from a first frame number. Driving data records may be grouped by channels module 540 into at least three driving records source data channels: control channel 542, chassis channel 545, and localization channel 548.

Control channel 542: Driving records generated by an ADV control channel 542 include information about control systems of the ADV, such as throttle, steering, and braking. Control channel 542 driving records can be generated by a control module of the ADV, e.g. control module 306. Driving records are logged by e.g. driving logger 308. Each driving record can include fields for: a timestamp of the driving record, a throttle control value that is sent to a throttle control system of the ADV, a steering control value sent to the steering control system of the ADV, and a braking control value that is sent to the ADV braking system. A throttle control value can be expressed as a percentage, e.g. 0 . . . 100%. In embodiment, the throttle control value can be expressed as, or converted from the percentage to, e.g. an integer value, such as a 12-bit digital value in the range of 0 . . . 4095. The digital value may be used by a digital to analog convertor (DAC) of the ADV control system to command a throttle system of the ADV. Similarly, a braking value can be expressed as a percentage or a digital value that may be converted by a DAC to an analog value to control the braking system of the ADV. A steering input command can be expressed in degrees, such as ±0 . . . 40° for an amount of steering left or right. In an embodiment, the steering input value can be expressed in radians rather than degrees.

Chassis channel 545: The chassis driving data channel 545 can include sensor output values or readings from a plurality of chassis sensors, including but not limited to: a lateral acceleration sensor, a front/rear acceleration sensor, a vertical acceleration sensor, a pitch sensor, a roll sensor, a position sensor of an actuator of the braking system, a position sensor of an actuator of the throttle system, and a position sensor of the steering system. The lateral acceleration sensor, front/rear acceleration sensor, and vertical acceleration sensor can each have one or more threshold values that are deemed indicative of a level of comfort and/or safety for the passengers of the ADV. Pitch and roll sensors indicate a forward/backward pitching of the chassis or a sideward rolling force about an axis of the ADV, respectively. Pitch and roll values can each have one or more threshold values that are deemed indicative of a level of comfort and/or safety for the passengers of the ADV. The chassis channel 545 can further include actuator sensors for the brake system, throttle system, and steering system to measure an actual position of each system.

Localization channel 548: Localization channel 548 driving data records can include information regarding a location and heading of the ADV with respect to a high-definition (HD) digital map or a global positioning satellite (GPS) system. The localization information can include a planned heading, a planned station along a route, a planned speed, and a planned acceleration, received from a planning system such as planning module 305. Localization channel 548 can further include driving data records indicating an actual heading, an actual station along a planned route, an actual speed, and an actual acceleration of the ADV or simulated ADV.

The above source data 530 from data channels 540 of an ADV are further processed by feature filtering system 550. Feature filtering 550 includes a driving mode filter 552, a shift position filter 555, and a timestamp alignment module 558.

Driving mode filter 552 filters the driving records to include only autonomous driving vehicle mode driving records. Driving records for manual (human) driving mode and for hybrid driving mode (both human and autonomous) are filtered out by driving mode filter 552. Driving mode filter 552 can further filter out driving records indicating an ADV speed of zero, except at an end of route station of the ADV. Station and heading values at the end of a driving route are analyzed by analysis module 570 and are included as driving records, even though the ADV speed at the end of route should be zero. Shift filter 555 also filters the driving records to include, or exclude, driving records based on whether a gear position of the ADV is in a forward driving gear or a reverse driving gear. Shift filter 555 further is configured to exclude driving records when a gearshift position of the ADV is "park" or "neutral."

Timestamp alignment module 558 aligns driving records according to their respective time stamps in preparation for generating the set of controller performance metrics by analysis module 570. For example, for the analysis module 570 to generate a station error metric, "station_err_std," the analysis module 570 computes a difference, at a point in time, between a planned station of the ADV along a trajectory of a route and an actual station of the ADV along the trajectory of the route for a large plurality of station points. Similarly, metrics are generated for heading error, pitch amount, roll amount, speed error, acceleration error, vertical acceleration amount (e.g. "bump"), lateral acceleration error (e.g., lateral "jerk" feeling) or forward/backward acceleration (e.g. "jerk forward" due to braking or "jerk back" feeling due to throttle use).

Raw data can be generated by analysis module 570 which can be used by visualization module 560 to generate plots and histograms of the raw data. Example plots of the raw data are described below with reference to FIGS. 9A-9D. Raw data and/or visualization data for plots and histograms can be stored in a standardized data format such as HDF4 or HDF5.

Analysis module 570 generates a standard set metrics for all ADV driving data, both simulated driving and actual road-test driving, after the source data 530 has been filtered by feature filtering 550. The standard set of metrics includes, for example, the following metrics computed from the filtered source data. The standard set of metrics can be organized into control performance metrics 572, safety metrics 574, sensation metrics 576, and usage metrics 578. The described set of standardized metrics is illustrative and non-exhaustive. Control performance 572 metrics are metrics that relate to performance of the ADV vehicle controller in accurately following station and heading information of a planned trajectory of an ADV route. Safety 574 metrics are metrics that relate to how safely the ADV is being navigated and can include the "worst case" control accuracy of station, speed, lateral position and heading control, and the control accuracy at some specific points, e.g., an end of route or end of a portion of a driving route, such as stopping for a pedestrian, a stop sign, a stop light, or a stopped vehicle. Safety 574 metrics can also include indicating a distance away from obstacles (people, parked cars, etc.). Sensation 576 metrics can include how smoothly the ADV was driven, such as whether there is excessive pitch, roll, acceleration, bumpiness, sharp turning or braking, and the like. Usage 578 metrics can include indicating how large and how frequently control adjustments are made by the ADV controller to the steering, throttle, and braking control systems in the ADV controller's effort to maintain the station and heading of the trajectory of the ADV route. An example, illustrative, non-exhaustive set of metrics for evaluating performance of an ADV controller are described below, with reference to the following tables I through IV. In the following tables, harsh driving conditions are driving conditions that are extraordinary, such as extreme traffic, unusually high amount of curves vs. straight-aways, unusually high amount of stop signs or traffic lights per unit distance of roadway. Quantitative thresholds for characterizing "harsh" driving conditions can be configurable in the control profiling system.

TABLE I

| Control Performance Metric 572 | |
|---|---|
| Metric | Description |
| Station_Err_Std | Standard deviation of error between actual and planned vehicle station. |
| Station_Err_Std_Harsh | Standard deviation of error between actual and planned vehicle station under harsh driving conditions. |
| Speed_Err_Std | Standard deviation of error between actual and planned vehicle speed. |
| Speed_Err_Std_Harsh | Standard deviation of error between actual and planned vehicle speed under harsh driving conditions. |
| Lateral_Err_Std | Standard deviation of error between actual and planned vehicle lateral position. |
| Lateral_Err_Std_Harsh | Standard deviation of error between actual and planned vehicle lateral position under harsh driving conditions. |
| Lateral_Err_Rate_Std | Standard deviation of rate of change of error between actual and planned vehicle lateral position. |
| Lateral_Err_Rate_Std_Harsh | Standard deviation of rate of change of error between actual and planned vehicle lateral position under harsh driving conditions. |
| Heading_Err_Std | Standard deviation of error between actual and planned vehicle heading. |
| Heading_Err_Std_Harsh | Standard deviation of error between actual and planned vehicle heading under harsh driving conditions. |
| Heading_Err_Rate_Std | Standard deviation of rate of change of error between actual and planned vehicle heading. |
| Heading_Err_Rate_Std_Harsh | Standard deviation of rate of change of error between actual and planned vehicle heading under harsh driving conditions. |

TABLE II

Safety Metric 574

| Metric | Description |
| --- | --- |
| Station_Err_Peak | Peak error between actual and planned vehicle station and its timestamp. |
| Speed_Err_Peak | Peak error between actual and planned vehicle speed and its timestamp. |
| Lateral_Err_Peak | Peak error between actual and planned vehicle lateral position and its timestamp. |
| Lateral_Err_Rate_Peak | Peak rate of change of error between actual and planned vehicle lateral position and its timestamp. |
| Heading_Err_Peak | Peak error between actual and planned vehicle heading and its timestamp. |
| Heading_Err_Rate_Peak | Peak rate of change of error between actual and planned vehicle heading and its timestamp. |
| Ending_Station_Err_Trajectory_0 | Error between actual and planned ending station, for the ending point of a first planned trajectory. |
| Ending_Station_Err_Trajectory_1 | Error between actual and planned ending station, for the ending point of a second planned trajectory. |
| Ending_Station_Err_Trajectory_2 | Error between actual and planned ending station, for the ending point of a third planned trajectory. |
| Ending_Station_Err_Trajectory_3 | Error between actual and planned ending station, for the ending point of a fourth planned trajectory. |
| Ending_Lateral_Err_Trajectory_0 | Error between actual and planned ending lateral position, for the ending point of a first planned trajectory. |
| Ending_Lateral_Err_Trajectory_1 | Error between actual and planned ending lateral position, for the ending point of a second planned trajectory. |
| Ending_Lateral_Err_Trajectory_2 | Error between actual and planned ending lateral position, for the ending point of a third planned trajectory. |
| Ending_Lateral_Err_Trajectory_3 | Error between actual and planned ending lateral position, for the ending point of a fourth planned trajectory. |

TABLE III

Sensation (comfort) Metric 576

| Metric | Description |
| --- | --- |
| Acc_Bad_Sensation | Count of occurrences of actual > maximum threshold acceleration sensation (lateral, front/back, or vertical) |
| Jerk_Bad_Sensation | Count of occurrences of actual > maximum threshold "jerk" sensation (lateral, front/back, or vertical). |
| Heading_Acc_Bad_Sensation | Count of occurrences of actual > maximum threshold heading sensation (e.g. rapid heading change) |
| Heading_Jerk_Bad_Sensation | Count of occurrences of actual > maximum threshold heading sensation (e.g. harsh heading change) |

TABLE IV

Usage Metric 578

| Metric | Description |
| --- | --- |
| Throttle_Control_Usage | Standard deviation of percentage of throttle control usage, over time. |
| Throttle_Control_Usage_Harsh | Standard deviation of percentage of throttle control usage, over time, during harsh driving conditions. |
| Brake_Control_Usage | Standard deviation of percentage of brake control usage, over time during standard driving. |
| Brake_Control_Usage_Harsh | Standard deviation of percentage of brake control usage, over time, during harsh driving conditions. |
| Steering_Control_Usage | Standard deviation of percentage of steering control usage, over time. |
| Steering_Control_Usage_Harsh | Standard deviation of percentage of steering control usage, over time, during harsh driving conditions. |
| Throttle_DeadZone_Mean | Average amount of time between throttle command and throttle actuation. |
| Brake_DeadZone_Mean | Average amount of time between brake command and brake actuation. |

TABLE IV-continued

Usage Metric 578

| Metric | Description |
| --- | --- |
| Total_Time_Usage | Standard deviation of the percentage of control-module computation time over the unit sample time of a frame |
| Total_Time_Peak | Peak percentage of control-module computation time over the unit sample time of a frame |
| Total_Time_Exceeded_Count | Count of occurrences of control-module computation time > the unit sample time of a frame |
| Pose_Heading_Offset_Std | Standard deviation of the offset between location movement direction and IMU measured heading direction |
| Pose_Heading_Offset_Peak | Peak of the offset between location movement direction and IMU measured heading direction |

The following example illustrates a method of computing the metric "lateral_error_std." Other metrics are similarly calculated. Alternative algorithms may be used for the lateral_error_std ADV controller metric, $\mu_y$.

$$\mu_y = \sqrt{\sum_{i=0}^{N} \frac{(y_i - y_{des,i})^2}{(L_{wheelbase} * k_{des,i} * \dot{x}_{des,i} * \Delta t * n_{frame})^2} / N - 1},$$

where:

$y_i$ is the actual lateral position of the ADV at time increment i, $Y_{des,i}$ is the planned lateral position of the ADV at time increment i, $L_{wheelbase}$ is the length of the wheelbase of the ADV, $k_{des,i}$ is the planned curvature of the trajectory of the ADV at time increment i, $\dot{x}_{des,i}$ is the planned longitudinal speed at time increment i, $\Delta t$ is the time between increments of i (i.e., sample time of a single frame), and $n_{frame}$ is a pre-defined number of frames of data.

Feedback to design model 580 can pass the visualization data 560 generated by analysis module 570 to simulation platform 510. Simulation platform 510 can receive the visualization data 560 and generate one or more plots or histograms from the visualization data 560. In an embodiment, the ADV controller type 538, for which analysis was performed by analysis module 570, can have one or more tunable parameters that modify corresponding characteristics of the ADV controller type. An updated ADV controller can be generated from inputs received from design engineers and/or changes to tunable parameters generated automatically by feedback to design model 580, utilizing the set of metrics generated by analysis module 570. Feedback to design model 580 can pass the set of metrics generated by analysis module 570, the visualization data 560, and any automatically generated proposed modifications for updating the ADV controller type from feedback to design model 580, to distribute results 590 module. Distribute results 590 module distributes the aforementioned information to design engineers for further analysis. Such analysis can result in an updated ADV controller having the ADV controller type.

Figure 6A:
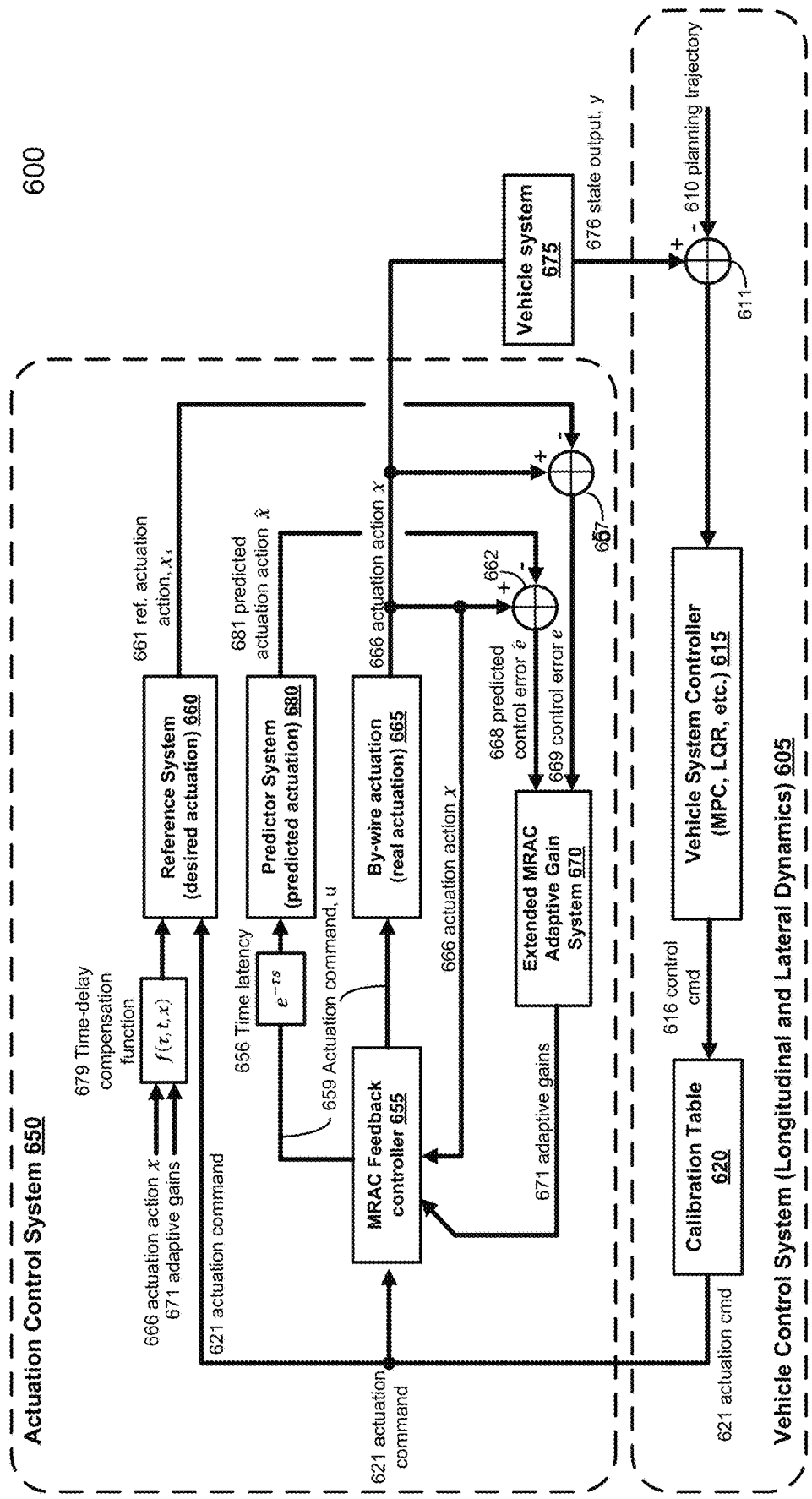
FIGS. 6A-6C are block diagrams illustrating a data flow and a system that incorporates an extended model reference adaptive controller (MRAC) that improves actuation of one or more control subsystems in an autonomous driving vehicle, according to one embodiment.

FIG. 6A is a block diagram illustrating a data flow and a system 600 that incorporates an extended model reference adaptive controller (MRAC) that includes a predictor system, and that improves control bandwidth of actuation of one or more control subsystems of an autonomous driving vehicle (ADV), according to one embodiment. Control subsystems can include braking, throttling, and steering systems of the ADV. When actuating a control subsystem using "drive-by-wire," there are second order dynamic delays and a time-latency of the control subsystem. Second order dynamics delays can include rise time, overshoot, and settling time of the measured state of actuation of the control subsystem, relative to the input actuation command. Actuation system 650 can reduce the second order actuation dynamic delays and time-latency to produce a smoother actuation control of a control subsystem using model reference 660, predictor system 680, model reference adaptive control (MRAC) feedback controller 655, and an extended MRAC adaptive gain system 670.

The auxiliary (reference) system 660 uses a time-delay compensation function 679 to reflect the "time-delay" effect in the real-world by-wire actuation system 665. Then, a delayed "desired" actuation output 661 is created by the reference system 660 to compare with the "imperfect" by-wire actuation system 665 actuation output 666, which contains both dynamic delay and time-latency in the vehicle actuation system 605. The control error 669 between the reference actuation action 661 and the by-wire actuation action 666 between them is the control error 669 that will be used in the adaptive gain process 670.

The predictor system 680 uses a "loop-shaping" mathematic model to "predict" the actuation system response in the near future time-horizon, and then, creates a "future" predicted actuation action 681 that contains a time-latency effect 656 to compare with the by-wire actuation action 666 of the vehicle control system 605. The predicted control error 668 between the predicted actuation action 681 and the by-wire actuation action 666 will also be used by the adaptive gain process 670 to determined adaptive gains 671.

The MRAC feedback controller 655 generates a "realizable" actuation action 659 control by feeding back the inputs/states/etc. using the (dynamically-tuned) adaptive gains 671.

Extended-MRAC adaptive gain system 670 performs online-adjustment of the adaptive gains 671 to ensure the convergence and stability of the inner closed-loop system of the actuation control system 650. The MRAC is extended to cover two aspects of dynamic components: the control error 669 between the "reference" system 660 and the "actual" (by-wire) system 665, and the predicted control error 668 between the "predictor" system 680 and the "actual" (by-wire) system 665.

The system 600 includes a vehicle system 605 controller and an actuation system 650. Actuation system 650 can include functionality for all control subsystems (throttle, braking, steering). In an embodiment, one or more control subsystems each have a respective actuation system 650.

Vehicle system 605 can include a vehicle system controller 615 and a calibration table 620. Vehicle system 605 can be considered an "outer loop" with respect to actuation system 650 being an "inner loop" which can iterate as fast, or faster, than the vehicle systems 605 "outer loop." The outer loop addresses vehicle lateral dynamics. The inner loop addresses the vehicle actuation dynamics, e.g. steering, braking, or throttle actuation dynamics.

In operation, vehicle system 605 receives a planning trajectory 610, from a perception and planning system, e.g. perception and planning system 111, of the ADV. A summing circuit 611 receives the planning and trajectory 610 signal and also receives a state output, y, 676 of the vehicle system 675. State output 676 represents a current measured state of actuation of a control subsystem of vehicle system (e.g. chassis) 675. For example, planning and trajectory 610 may specify that a steering subsystem is commanded to be actuated to 8° left of center, and state output 676 reports that the current state of the steering subsystem is 5° left of center. Summing circuit 611 can report the difference as an additional 3° left of center, to vehicle system controller 615.

Vehicle system controller 615 can be any type of ADV vehicle controller such as model predictive controller (MPC) or a linear quadratic regulator (LQR). Vehicle system controller 615 outputs a control command 616 (e.g. a steering command) to calibration table 620. Calibration table 620 generates a subsystem control actuation command 621, e.g. a command to actuate the steering control subsystem to the planning trajectory 610 input of 8° with a steering input of an additional 3° left of center command (desired input 621) to achieve the 8° left of center indicated in the planning and trajectory signal 610. The desired input action, r, 621 is input to both the MRAC feedback controller 655 and the reference (desired actuation) system 660.

Figure 6B:
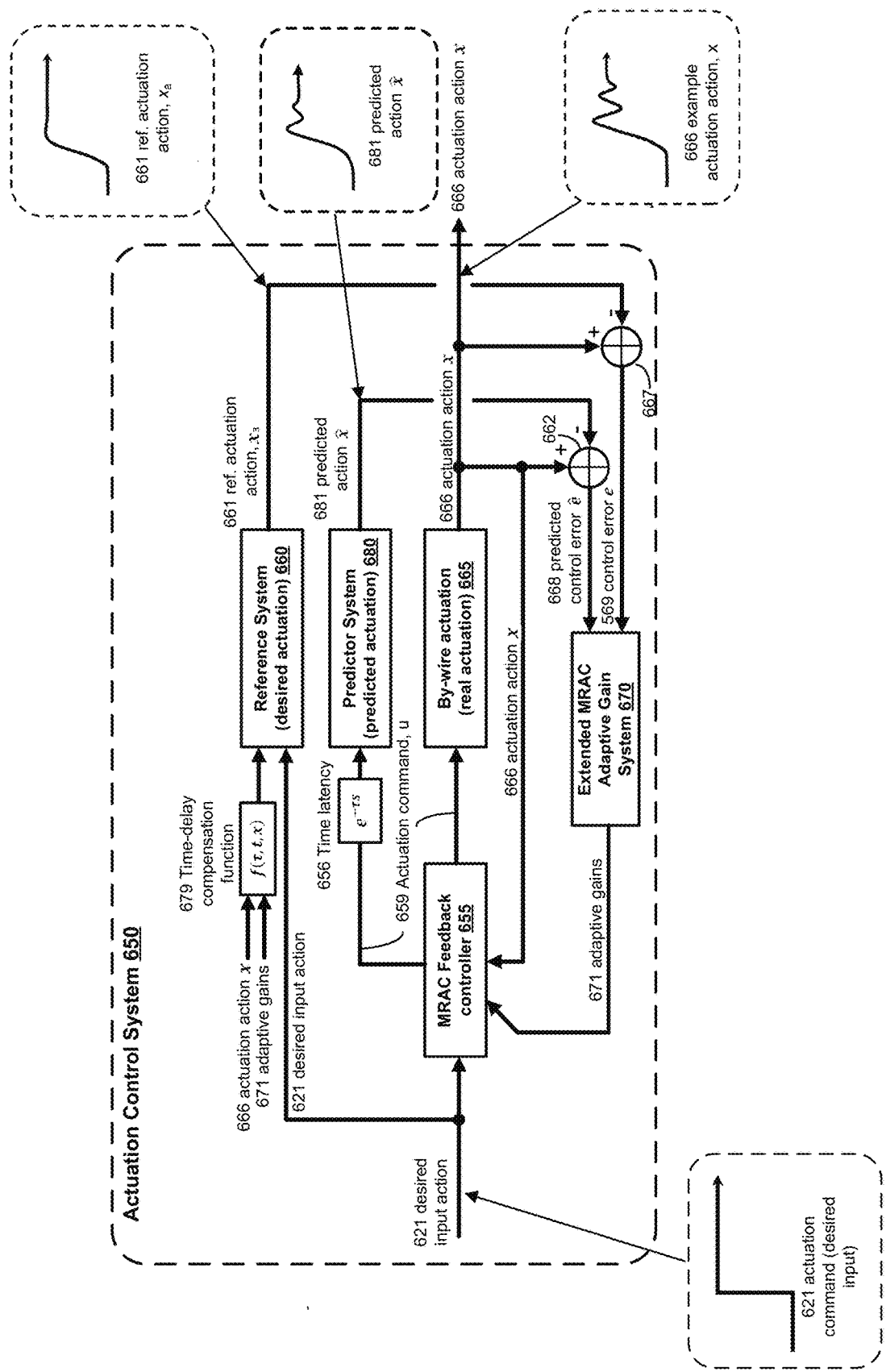
Figure 6C:
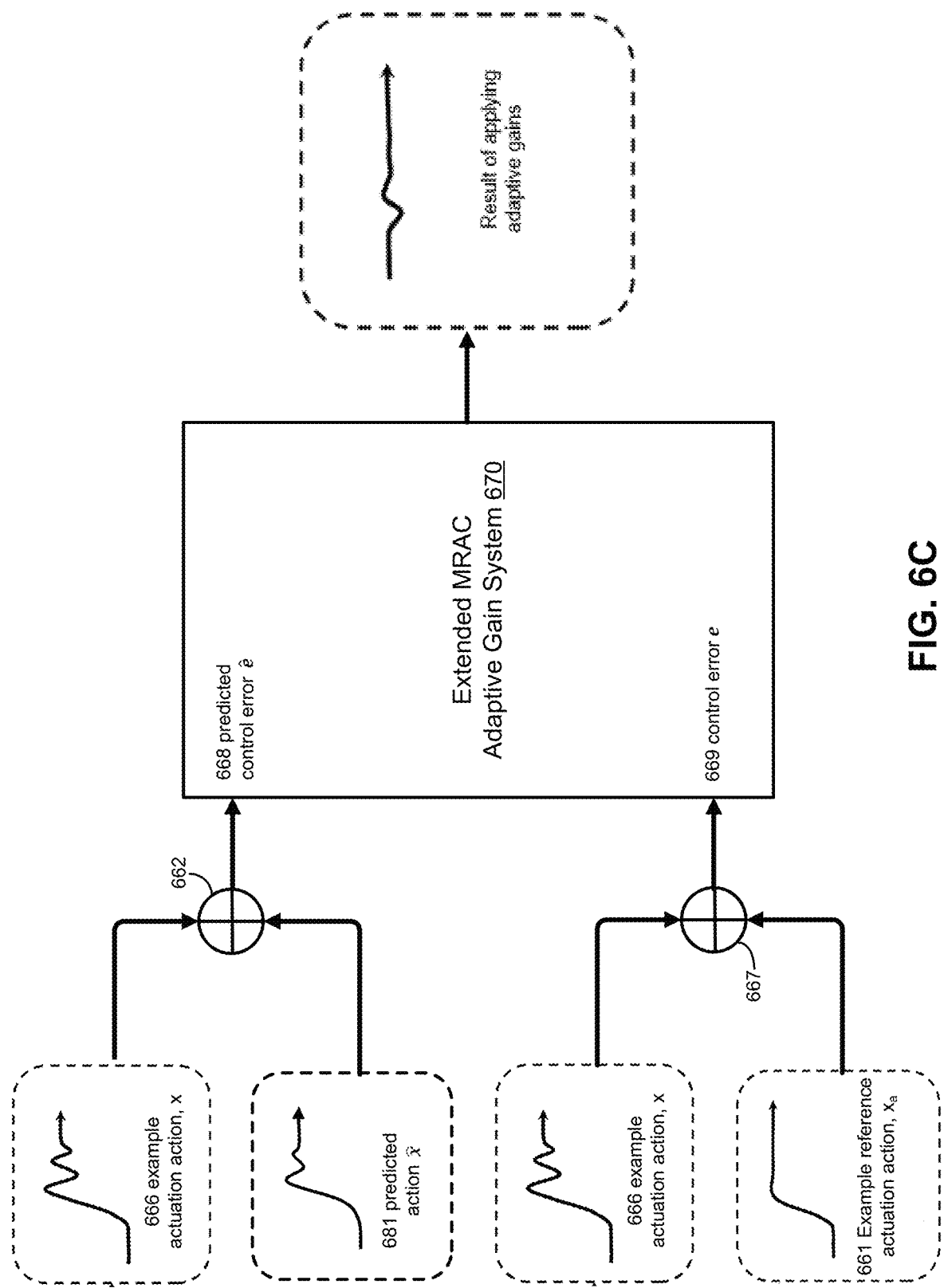

Referring now to FIG. 6B, an example desired input action 621 is shown as a step function input to the actuation system 650. In practice, input to an actuation system of a control subsystem is rarely a step function. However, the step function serves to illustrate the second order actuation dynamics of actuation system 650. Second order actuation dynamics are also described above, with reference to FIG. 3C. The desired input action 621 is passed to the MRAC feedback controller 655 and a reference system 660, at a time $t_0$.

Reference system 660 receives the desired input action 621 and creates a "desired" or "reference" actuation action 661 to compare with the "imperfect" by-wire actuation system 665 actuation action 666 of vehicle system 605. Model reference system 660 outputs the reference actuation action 661 to comparator (or, "summing circuit") 667 for comparison with by-wire actuation action 666, described below. A control error 669 is determined as the difference between the model reference actuation action 661 and the by-wire actuation action 666. Reference system 660 can look up a reference actuation action 661 that corresponds to the received desired input 621. The reference actuation action 661 can be retrieved from reference actuation outputs 206 storage of subsystem controller(s) 205 as shown with reference to FIG. 2, above. Second order dynamics delays and time-latency can be identified and characterized in a control subsystem as described in Applicant's related U.S. patent application Ser. No. 16/790,036 filed on Feb. 13, 2020, to Yu WANG et al., entitled, "Autonomous Vehicle Actuation Dynamics and Latency Identification." Reference system 660 can be a machine generated, or a manually generated, actuation curve that takes into account the second order dynamics delays of the control subsystem. For example, given the example desired input 621, reference system 660 can look up or generate example desired reference action, $x_a$, 661. Desired reference actuation action 661 is received by summation circuit 667. The reference actuation action 661 is an ideal or desired output to achieve that may, or may not, be physically achievable by the by-wire actuation system 665, but the reference system 660 does take into account second order dynamics (e.g. rise time, overshoot, settling time) of the by-wire actuation system 665.

At substantially the same time that reference system 660 is determining reference actuation output 661, MRAC feedback controller 655 receives desired input 621. Assuming that desired input action 621 was received by MRAC feedback controller 655 at a time $t_0$, MRAC feedback controller 655 will not yet have received adaptive gains 671 related to desired input action 621. Thus, at time $t_0$, MRAC feedback controller 655 may pass desired input action 621 to by-wire actuation system 665 as actuation command, u, 659, without adaptive gains 671. In practice, by-wire actuation system 665 is very often a third party component which is treated as a black box. Thus, by-wire actuation system 665 generates an actuation action, x, 666 in accordance with the programming or logic of actuation system 665 as produced by the manufacturer of by-wire actuation system 665. The by-wire actuation action 666 is sent to (1) a vehicle system, e.g. 675, (2) a summation circuit 662, (3) a summation circuit 667 and (4) MRAC feedback controller 655 as input for MRAC feedback controller 655 at time $t_1$.

The predictor system 680 predicts a future predicted action 681, e.g. a future steering action, and uses the predicted action 681 to generate a predicted control error 668 that generates a faster and more accurate control response. In addition to the control error 669 from the reference system 660, the predicted control error 668 provides additional information about the by-wire actuation system's uncertain parameters. This additional information helps to better maintain the closed-loop stability and tracking performance. The extended MRAC with the predictor system has more potential to improve the robustness and transient performance of the actuation control system 650.

Predictor system 680 sends its predicted actuation action 681 to comparator 662. Comparator 662 determines a predicted control error 668 as the difference between actuation action 666 and predicted actuation action 681. Reference system 660 sends its reference actuation action 661 to comparator 667. Comparator 667 determines a control error 669 as the difference between actuation action 666 and reference action 661. Predicted control error 668 and control error 669 are passed to MRAC adaptive gain system 670 to determine adaptive gains 671 to feed back to MRAC feedback controller 655 for a next iteration of the inner control loop of actuation control system 650 at a time $t_1$, and subsequent times $t_2 \ldots t_n$, until execution of the actuation command 621 is completed or a new actuation command 621 is received. After the first iteration, at time $t_0$ of the inner control loop, adaptive gains 671 and the last actuation action 666 are fed back to a time-delay compensation function, $f(\tau, t, x)$, to introduce time-latency into the next reference actuation action 661 and to include the adaptive gains 671 into the next reference actuation action 661. The time-delay compensation function 679 gathers all of the time-latency related terms in the closed-loop mathematical model of the overall adaptive control system. A motivation for including the time-delay compensation in the design of the auxiliary ("reference") system 660 is to cancel these "time-latency" terms when calculating the difference between the actuation action 666 and the reference system action 661. By this design, the negative effect of the time-latency factors in the overall closed-loop system stability will be eliminated.

By-wire actuation action 666 includes real-world dynamic delays and time-latency. When the next control error 669 is determined, the real-world dynamic delay and time-latency in actuation 666 will be offset by the time-delay compensation introduced into the reference actuation action 661, thereby generating the control error 669 substantially without any dynamic delay or time-latency. Similarly, predicted action 681 will have time-latency introduced by time-latency module 656. When the next predicted error 668 is determined, the real-world dynamic delay and time-latency in actuation action 666 will be offset by the time-latency function 656, thereby generating the predicted error 668 substantially without any time-latency.

In an embodiment, adaptive gain 671 can be determined by MRAC adaptive gain system 670 as follows. A $1^{st}$ order system is discussed for simplification, which is sufficient for interpretation of the adaptive algorithm.

(1) Adaptive feedback law:
$u = \hat{k}_x x + \hat{k}_r r$ where
$\dot{\hat{k}}_x = -y_x x(p_{ref} e + p_{prd} \hat{e})$
$\dot{\hat{k}}_r = -y_r r(p_{ref} e + p_{prd} \hat{e})$
$y_x, y_r, > 0$ are constant adaptive gains that determine the convergence rate of the adaptive process; $p_{ref}, p_{prd} > 0$ are positive-determined constants of the reference system error and predictor system error, with the purpose of improving the system stability.

(2) Reference system dynamic functions, with time-delay compensation function:
$\dot{x}_a = a_{ref} x_a + b_{ref} r + f(\tau, t, x)$ wherein
$\theta(\tau, t, x) = b[\hat{k}_x(t-\tau)x(t-\tau) + \hat{k}_r(t-\tau)r(t-\tau) - \hat{k}_x x - \hat{k}_r r]$ where
$a_{ref}, b_{ref}$ are the reference state constant gain and input constant gain, $\tau$ is the time latency.

(3) Predictor system dynamic functions:
$\dot{\hat{x}} = a_{ref} \hat{x} + b_{ref} r - a_{prd} \hat{e} + b[u(t-\tau) - \hat{k}_x x - \hat{k}_r r]$ where
$a_{prd}$ is the predictor state constant gain.

(4) (Actual system—Reference system) dynamic functions:
$\dot{e} = a_{ref} e + b[x(\hat{k}_x - k_x^*) + r(\hat{k}_r - k_r^*)]$ where
$e = x - x_a$
$k_x^*, k_r^*$ are the ideal adaptive gains (5) (Actual system—Predictor system) dynamic functions:
$\dot{\hat{e}} = a_{prd} \hat{e} + b[x(\hat{k}_x - k_x^*) + r(\hat{k}_r - k_r^*)]$ where
$\hat{e} = x - \hat{x}$ Referring now to FIG. 6B, further illustrating the details of FIG. 6A, example reference actuation output 661 is summed with example actuation action 666 by summing circuit 667. The summed result is output as control error 669 to the extended MRAC feedback gain system 670. Example predicted actuation action 681 is summed with example actuation action 666 by summing circuit 662. The summed result is output as predicted error 668 to the MRAC adaptive gain system 670. MRAC adaptive gain system 670 generates adaptive gains 671 for use by MRAC feedback controller in a next iteration, $t_{n+1} = t_n + \Delta t$, wherein $\Delta t$ is a time increment. The time increment can be determined, or limited, by practical inner-loop iteration bandwidth. If a free-running inner loop iteration time is between 3-5 milliseconds (ms), inner loop iteration time may simply be to perform a next iteration upon completion of the last iteration. In an embodiment, the time increment of inner loop iteration may be fixed, e.g. 5 ms or 10 ms. The result of applying the adaptive gains 671 from extended MRAC adaptive gain system 670 to the by-wire actuation action 666 generates an actuation signal 659 with reduced error for the next iteration of the extended MRAC adaptive gain system 670 and MRAC feedback controller 655.

Figure 7:
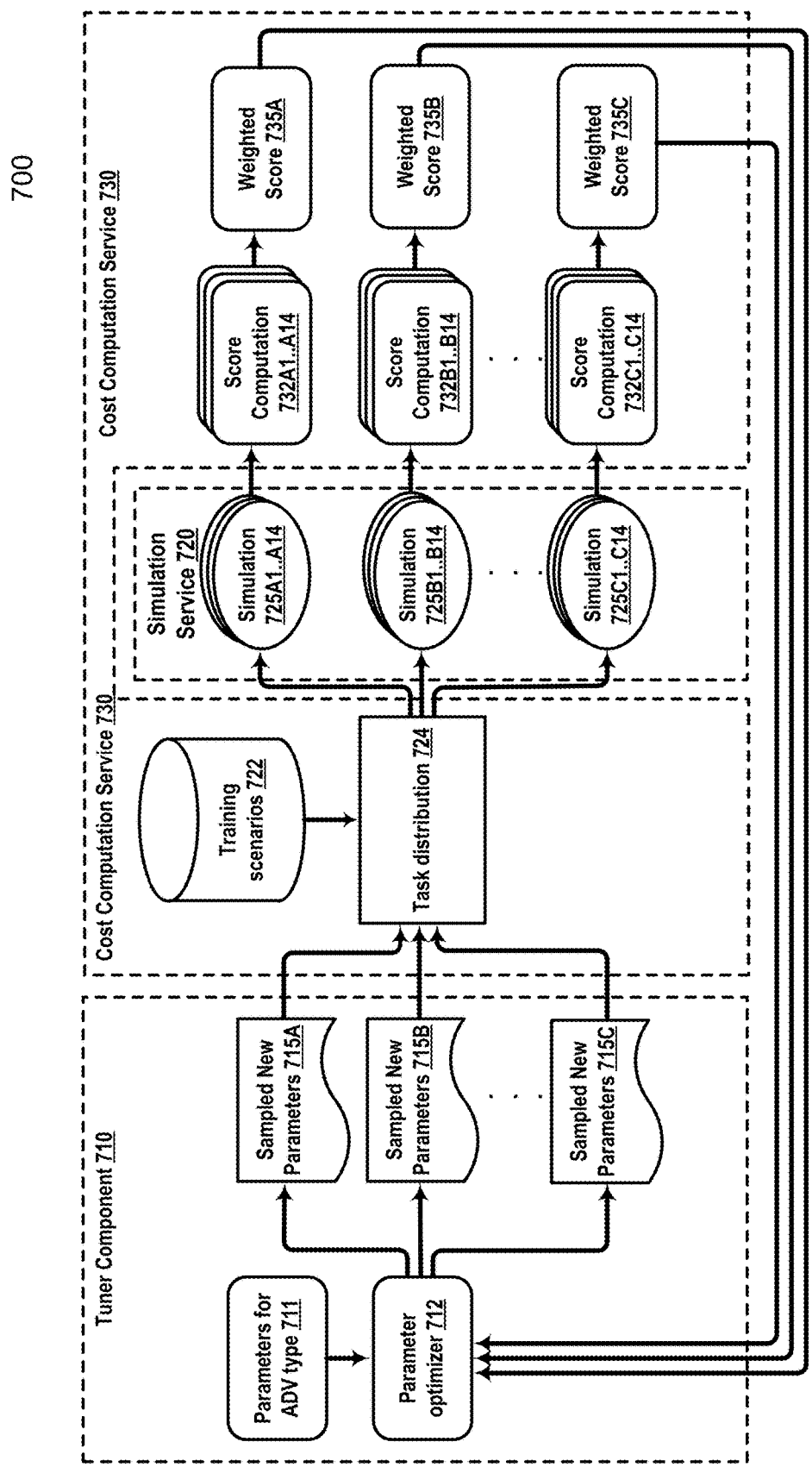
FIG. 7 is a block diagram illustrating a process flow of an automatic parameter tuning framework for controllers used in autonomous driving vehicles, according to cone embodiment.

FIG. 7 is a block diagram illustrating a process flow of an automatic parameter tuning framework 700 for controllers used in autonomous driving vehicles (ADVs), according to cone embodiment. Server 104 can include an ADV driving simulator. The driving simulator can simulate actual driving of one or more types of ADVs. Parameters for ADV type 711 can include a listing of tunable parameters for a type of ADV, and the types of ADVs that can be simulated in the driving simulator. Types of ADVs can include a compact ADV, a sport utility vehicle (SUV), a truck, a van, or other physical type of ADV. Autonomous driving for each type of ADV can be controlled by one or more controllers or subsystem controllers. A controller of the ADV can include logic to execute a portion of a planned vehicle path, guiding the ADV along the planned vehicle path by controlling control subsystems such as steering, braking, and throttle. Each controller or subsystem controller (collectively, "controllers") can include one or more tunable parameters that affect operation of the ADV having the ADV type. Controllers, include dynamic controllers such as a linear quadratic regulator (LQR), or other dynamic controller (e.g. "bicycle model"). Subsystem controllers, include a model-reference adaptive controller (MRAC) that optimizes actuation of a subsystem, e.g. steering, brakes, and throttle, in view of latency in the subsystem actuator(s). In an embodiment, each subsystem actuator can have its own instance of an MRAC controller. Server 104 can have logic to implement an automatic parameter tuning frame work to tune values for tunable parameters of each controller or subsystem controller, using a driving simulator.

The automatic parameter tuning framework 700 (APTF 700) includes a tuner component 710, a simulation service 720, and a cost computation service 730. APTF 700 can be practiced on a server system, such as servers 103 and/or 104 of FIG. 1.

To achieve high efficiency, tuner component 710 supports a parallel evaluation process by spawning multiple worker threads to sample different sets of parameter values in the configuration space of the one or more controllers of a selected ADV type, at the same time. The sampling method can be customized based upon the parameter optimizer 712 and a sampling policy. Parameter optimizer 712 can be a Bayesian Global Optimizer. The Bayesian Global Optimizer can utilize multiple surrogate models which are the probability models for approximating the objecting function, including Gaussian Process Regress (GPR) and Tree-structured Parzen Estimator (TPE), and the like.

These samples will be sent to the cost computation service 730. Each set of parameter values 715 is combined with a pre-selected set of training scenarios 722 to generate tasks where each task is a unique combination of one set of parameter values 715 and one training scenario 722. The tasks are managed and scheduled by task distribution 724 logic. The cost computation service 730, task distribution 724 logic, sends requests to simulation service 720 to execute the tasks. Since tasks are independent from each other, another round of efficiency boost is accomplish in the simulation service 720 by running all of the tasks in parallel and returning the execution records to the cost computation service 730 separately.

Upon receipt of each execution record, the cost computation service 730 calculates a score 720 for the task based on a range of metrics relevant to the controller being tuned. (See, Tables I, II, III, and IV, above). A weighted average score 735 is also obtained for the specific set of parameter values 715 across all training scenarios 722. This average score is fed back to the tuner component 710 for optimization in a next iteration by parameter optimizer 712.

Tuner component 710 can include a database 711 of vehicle types and tunable parameters for the ADV type for one or more controllers of the ADV type. The simulator can simulate driving of an ADV having the ADV type using the one or more controllers, with values for each of the one or more tunable parameters 715 as provided by parameter optimizer 712.

Parameter optimizer 712 receives a selection of an ADV type (e.g. compact car, van, truck, etc.) and a plurality of m tunable parameters ("set of sampled new parameters") 715 for the ADV type using the parameters for ADV type database 711. In an embodiment, the plurality m of tunable parameters 715 include one or more of (1) a time constant and an adaptive gain parameter for a model-reference adaptive gain controller that optimizes actuation of steering, braking, and/or throttle control subsystems, (2) a plurality of lateral dynamics parameters in a state weighting matrix of a linear quadratic regulator (LQR) of an ADV, (3) a low-speed and a high-speed proportional gain parameter, (4) a low-speed and a high speed integral gain parameter, and (5) a station error parameter of an LQR or other dynamic model controller of the ADV (e.g. "bicycle model" controller). For each of the m tunable parameters in a set of sampled new parameters 715, parameter optimizer 712 selects an initial ("first") value. In an embodiment, the initial value for each tunable parameter 715 can be randomly selected within a value range space for the tunable parameter. The parameter optimizer 712 iterates the data flow described with reference to FIG. 7 a predetermined fixed number of times. Each iteration produces a single weighted score 735 that is used as an objective by parameter optimizer 712 to modify the sampled parameters 715 for a next iteration of the optimizer. When the fixed number of iterations have been performed, the parameter optimizer 712 determines the optimal value for each tunable parameter in the plurality of tunable parameters 715. In subsequent iterations, parameter optimizer 712 can modify the values of the plurality of tunable parameters at each iteration of the optimization operations described herein. In an embodiment, parameter optimizer 712 can use the weighted score 735 to modify the values of the plurality of tunable parameters for a next iteration of the parameter optimizer 712.

Parameter optimizer 712 can be configured to optimize a predetermined fixed number of sets of tunable parameters 715 (also termed, "sampled new parameters 715"), such as sets of sampled new parameters 715A . . . 715C. Each set of sampled new parameters 715A . . . 715C can be optimized simultaneously, in parallel, and independently from one another. Optimization can include repeating the optimization process of FIG. 7 a predetermined fixed number of times. The predetermined fixed number of optimizer iterations for each of the sampled new parameters 715A . . . 715C can be the same number of optimizer iterations, such that when each set of sampled new parameters 715A . . . 715C complete their fixed number of optimization iterations, the parameter optimizer 712 can select a best one set of the sampled new parameters 715A . . . 715C using the weighted score 735A . . . 735C of each set of the sampled new parameters 715A . . . 715C at the completion of the fixed number of iterations.

Parameter optimizer 712 generates one or more sampled new parameters 715A . . . 715C ("plurality of tunable parameters") and passes the sampled new parameters 715A . . . 715C to task distribution 724 of cost computation service 730. There are m tunable parameters in a sampled new parameter set 715A . . . 715C, and each of the m tunable parameters has a value to be optimized by the parameter optimizer 712. The terms "optimizing the value of a parameter" and "optimizing the parameter" are used interchangeably herein. The goal of the parameter optimizer 712 is to find an optimal value for each of the m tunable parameters.

Cost computation service 730 can include a database of training scenarios 722. Training scenarios 722 can include several thousand different driving scenarios. For purposes of illustration, and not limitation, the operation of the automatic parameter tuning framework for controllers used in ADVs 700 will be described using a small subset, n, of the driving scenarios in training scenarios 722. In an embodiment, the plurality of driving scenarios can include: a left turn at high speed; a left turn at low speed; a right turn at high speed; a right turn at low speed; a U-turn at high speed; a U-turn at low speed; and a serpentine-shape successive side-pass. A serpentine-shape successive side-pass refers to a driving scenario wherein the autonomous driving vehicle (ADV) is following another vehicle in a first lane, and the ADV overtakes and passes the another vehicle using a second lane (either on the right or the left of the another vehicle), and the ADV returns to the first lane. The shape of the ADV driving path, when viewed from above, is serpentine-shaped. The passing of the another vehicle is successive in that the ADV makes a first lane change into the second lane, followed by the ADV overtaking (passing) the another vehicle, then the ADV making another lane change back to the first lane. Each of these driving scenarios may be simulated in a smooth driving action and a sharp driving action. Smooth driving and sharp driving can be expressed in terms of ADV speed and angle of steering. High speed and low speed can be configured for each type of ADV. Thus, the seven (7) example driving scenarios are each simulated using two (2) different manners of steering, for a total of m=fourteen (14) driving scenarios. A different selection or number of driving scenarios may be selected than the example driving scenarios used to describe the automatic parameter tuning framework for controllers used in ADVs 700.

Cost computation service 730 can further include task distribution logic 724. Task distribution 724 receives one more sets of sampled new parameters 715A . . . 715C and, for each of these sampled new parameters 715A . . . 715C, task distribution 724 receives a plurality of driving ("training") scenarios 722, such as the fourteen (14) driving scenarios described above. Task distribution 724 manages the generation and scheduling of simulations 725A . . . 725C for each of the selected driving scenarios 722 for each of the sets of sampled new parameters 715A . . . 715C. In an example, there can be three (3) sets of sampled new parameters 715 labeled 715A, 715B, and 715C, respectively. Each set of sampled new parameters 715A . . . 715C is used to run a simulation of each of the fourteen (14) driving scenarios 722. Thus, task distribution 724 will generate and schedule n simulations 725A1 . . . 725A14 for the set of sampled new parameters 725A, n simulations 725B1 . . . 725B14 for the set of sampled new parameters 725B, and n simulations 725C1 . . . 725C14 for the set of sampled new parameters 715C.

Simulation service 720 will perform a simulation task 725 for each of the simulations scheduled by task distribution 724. For each scheduled simulation (e.g. 1 through 14), for each set of sampled new parameters 715A . . . 715C, cost computation service 730 will generate a score 732 as to how well the ADV simulation 725 performed, using the set of sampled new parameters 715, as graded against a plurality of metrics (See, Tables I, II, III, and IV, above). Thus, for sampled new parameter set 715A, cost computation service 730 will provide a score computation for each of the simulations 725A1 . . . 725A14, with scores 732A1 . . . 732A14. Cost computation service 730 will also provide a single weighted score 735A representing performance of the ADV using values of the set of sampled new parameters 715A in the one or more controllers of the simulated ADV for all of the fourteen (14) simulations. In an embodiment, the weights used to generate the weighted score 735 reflect higher, or lower, relative importance of certain metrics in the plurality of metrics used to generate a score computation 732. For example, a station endpoint error of the driving scenario may be weighted higher than an average speed error. Safety errors may be weighted higher than passenger comfort errors, passenger comfort errors may be weighted higher than frequency of usage of the controls, such as braking, steering, or throttle. The preceding weightings are by way of example, and not limitation. One of skill in the art may select a different weightings among metric groups (control, safety, comfort, usage), and/or different weightings among metrics within a metric group.

Cost computation service 730 provides weighted scores 735A . . . 735C to parameter optimizer 712. Parameter optimizer 712 can use the weighted score 735A to modify the sampled new parameters 715A for a next iteration ("repetition") of the optimizer to find optimal values for the sampled new parameters 715A. Similarly, parameter optimizer 712 can use weighted score 735B to modify the sampled new parameters 715B for a next iteration of the optimizer to find optimal values for the sampled new parameters 715B. Additionally, parameter optimizer 712 can use weighted score 735C to modify the sampled new parameters 715C for a next iteration of the parameter optimizer 712 to find optimized values for the sampled new parameters 715C. In an embodiment, sampled new parameters 715A . . . 715C can all be for a same type of ADV (e.g. compact car, truck, van, etc.). In an embodiment, at the end of a configurable, predetermined fixed number of iterations of the parameter optimizer 712, a best set of new sampled parameters 715 can be selected from the three (3) sets of sampled new parameters 715A . . . 715C, and the best set of sampled new parameters 715 can be downloaded to a physical, real-world ADV having the ADV type for the sampled new parameters 715A . . . 715C, to navigate the ADV having the ADV type. In an embodiment, each of sampled new parameters 715A . . . 715C can be for a different ADV type. At the completion of the fixed number of iterations of the parameter optimizer 712, each set of sampled new parameters is optimized. Each of the optimized sample new parameter sets 715A . . . 715C can be downloaded to a physical, real-world ADV of the ADV type for the sample new parameter set, and each ADV of the physical real-world ADVs can be navigated using the values of the optimized set of sampled new parameters for the ADV type. For each set of sampled new parameters 715, a best set of values for the sampled new parameter set can be one or more of: (1) the values of the parameters in the set of sampled new parameters 715 at the end of the fixed number of iterations of the parameter optimizer 712, (2) the values of the set of parameters in the sampled new parameters 715 at the end of the fixed number of iterations, as would be modified by the parameter optimizer 712 if there were to be one or more iteration of the parameter optimizer 712, or (3) the values of the set of sampled new parameters 715 after an iteration of the parameter optimizer 712, if the difference between the weighted score 735 of the current iteration is less than the weighted score 735 of a preceding iteration of the parameter optimizer 712 by a predetermined threshold amount. In an embodiment wherein the sampled new parameter sets 715A . . . 715C all relate to a same type of ADV, then the best values among sampled new parameter sets 715A . . . 715C can be the sampled new parameter set 715 having the best weighted score 735 after the end of optimizing each of the sampled new parameter sets 715A . . . 715C.

Figure 8:
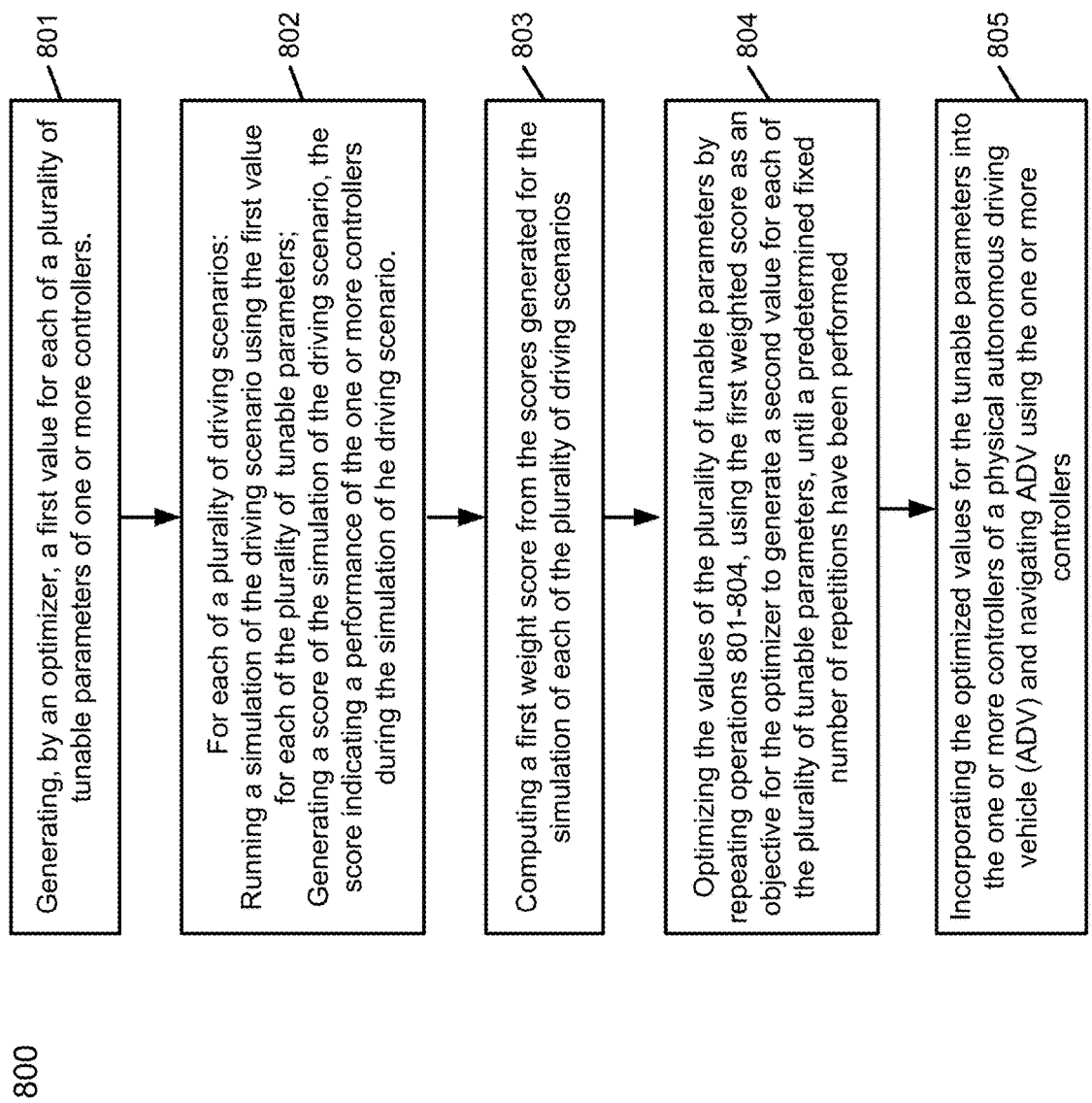
FIG. 8 is a method of automatic parameter tuning for controllers used in ADVs, according to one embodiment.

FIG. 8 is a method 800 of automatic parameter tuning for controllers used in ADVs, according to one embodiment. Method 800 can be practiced on, e.g., server 104, described above with reference to FIG. 1. Server 104 can include parallel processing and/or multiple processors and/or one or more processors with multiple cores, such that multiple instances of method 800 can be practiced simultaneously on server 104, or upon multiple servers e.g. servers 103 and 104.

In operation 801, an optimizer, e.g. a Bayesian Global Optimizer, can generate a first value for each of a plurality of tunable parameters for one or more controllers of an ADV.

In operation 802, for each of a plurality of driving scenarios: a simulation of each driving scenario can be run using the first value for each of the tunable parameter in the plurality of tunable parameters. In an embodiment, each value of a tunable parameter can be randomly selected. A score is generated for the driving scenario using the first values of the plurality of tunable parameters. Scoring for each driving scenario represents how well the ADV performed against a set of metrics, as described above in Tables I, II, III, and IV.

In operation 803, a single weighted score is computed from scores of each of the plurality of driving scenarios. In an embodiment, the weights in the weighted score may weight safety performance higher than control performance (accuracy of station, etc.), and control performance higher than comfort performance. Weights for each of the performance metrics, can be configured independently. In an embodiment, weights for each of the performance metric types, e.g. control performance, safety performance, comfort performance, and control subsystem usage performance (e.g. steering, throttle, brakes) can be independently configured.

In operation 804, the optimizer can receive the single weighted score of the plurality of driving scenarios, and can use the single weighted score as a new objective for selecting a second value for each of the plurality of tunable parameters, and can then re-run the optimizations 801-804 with the second, or subsequent, values for the plurality of tunable parameters. Operations 801-804 can be repeated a fixed number of times. The fixed number of times can be configurable.

In operation 805, the optimized values for each of the plurality of tunable parameters can be incorporated into the one or more controllers of a physical ADV. In an embodiment, the optimized values are the values of the plurality of tunable parameters that were used in the last repetition of operations 801-804. In an embodiment, the optimized values are the values of the plurality of tunable parameters that are selected by the optimizer for a next repetition of operations 801-804, although the next repetition is not run after the fixed number of repetitions is completed. The physical ADV is navigated using the one or more controllers that have been updated with the optimized values of the plurality of tunable parameters.

Figure 9A:
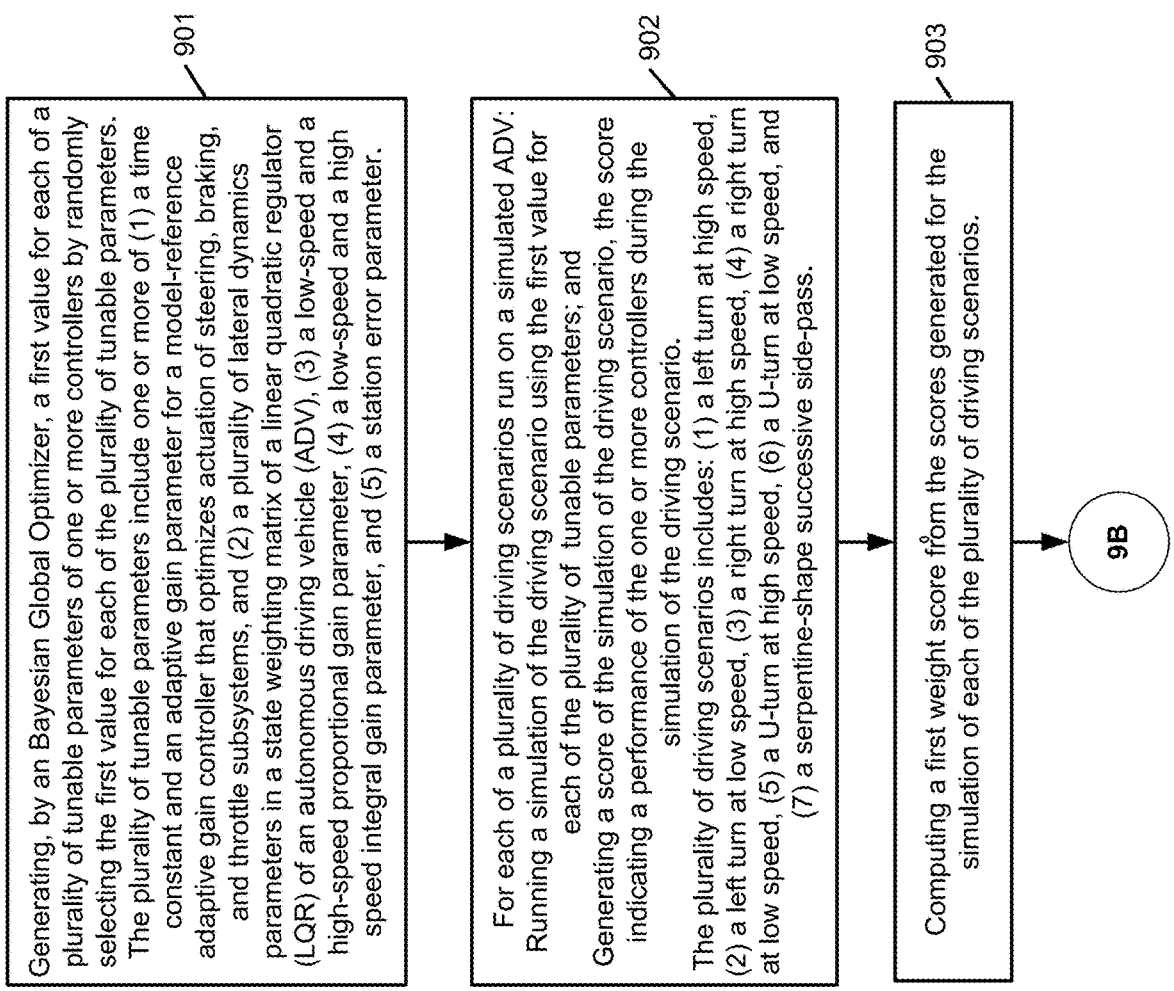
FIGS. 9A and 9B are a method of automatic parameter tuning for controllers used in autonomous driving vehicles, according to one embodiment.
Figure 9B:
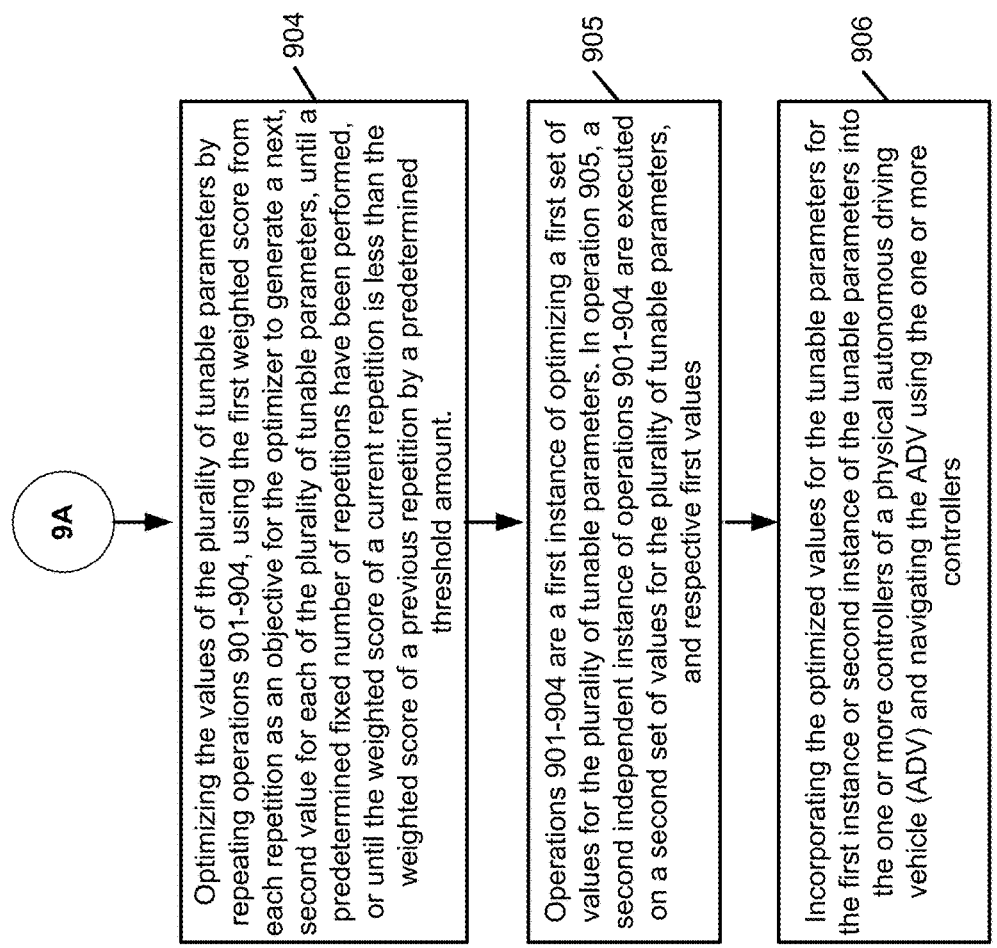

FIGS. 9A and 9B are a method 900 of automatic parameter tuning for controllers used in autonomous driving vehicles, according to one embodiment.

In operation 901, a Bayesian Global Optimizer generates a first value for each of a plurality of tunable parameters of one or more controllers of a simulated ADV having a specific type (e.g. SUV, truck, van, compact car, etc.). Operations 901 through 905 will be repeated a specified predetermined number of times. In this first iteration of operations 901-905, the value of each of the plurality of tunable parameters can be selected at random, within the low-to-high range of values for the tunable parameter. In an embodiment, each of the tunable parameters in the set of tunable parameters can be normalized to a range of, e.g., 0.000 to 1.000, or other normalized range. The plurality of tunable parameters include one or more of (1) a time constant and an adaptive gain parameter for a model-reference adaptive gain controller that optimizes actuation of steering, braking, and throttle subsystems, and (2) a plurality of lateral dynamics parameters in a state weighting matrix of a linear quadratic regulator (LQR) of an autonomous driving vehicle (ADV), (3) a low-speed and a high-speed proportional gain parameter, (4) a low-speed and a high speed integral gain parameter, and (5) a station error parameter of an LQR or other dynamic model controller of the ADV (e.g. "bicycle model").

In operation 902, for each of a plurality of driving scenarios, a simulation of the driving scenario is run using the first values of the plurality of tunable parameters, and a score is generated for the driving scenario indicating the performance of the one or more controllers during the simulation of the driving scenario. The plurality of driving scenarios can include: (1) a left turn at high speed, (2) a left turn at low speed, (3) a right turn at high speed, (4) a right turn at low speed, (5) a U-turn at high speed, (6) a U-turn at low speed, and (7) a serpentine-shape successive side-pass.

In operation 903, a single weighted score is computed from scores of each of the plurality of driving scenarios. In an embodiment, the weights in the weighted score may weight safety performance higher than control performance (accuracy of station, etc.), and control performance higher than comfort performance. Weights for each of the performance metrics, can be configured independently. In an embodiment, weights for each of the performance metric types, e.g. control performance, safety performance, comfort performance, and control subsystem usage performance (e.g. steering, throttle, brakes) can be independently configured.

In operation 904, the optimizer can receive the single weighted score of the plurality of driving scenarios, and can use the single weighted score as a new objective for selecting a second value for each of the plurality of tunable parameters, and can then re-run the optimizations 901-904 with the second, or subsequent, values for the plurality of tunable parameters. Operations 901-904 can be repeated a fixed number of times. The fixed number of times can be configurable. In an embodiment, operations 901-904 can be repeated, using the first weighted score from each repetition as an objective for the optimizer to generate a next, second value for each of the plurality of tunable parameters, until a predetermined fixed number of repetitions have been performed, or until the weighted score of a current repetition is less than the weighted score of a previous repetition by a predetermined threshold amount.

Operations 901-904 are a first instance of optimizing a first set of values for the plurality of tunable parameters. In operation 905, a second independent instance of operations 901-904 are executed on a second set of values for the plurality of tunable parameters.

In operation 906, the optimized values for each of the plurality of tunable parameters can be incorporated into the one or more controllers of a physical ADV. In an embodiment, the optimized values are the values of the plurality of tunable parameters that were used in the last repetition of operations 901-904, or the set of optimized values of the plurality of tunable parameters of the second independent instance of operations 901-904. The ADV is navigated using the one or more controllers that have been updated with the optimized values of the plurality of tunable parameters.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of automatic tuning of one or more controllers of an autonomous driving vehicle (ADV) control system, comprising:
    for each of a plurality of driving scenarios:
        running a simulation of the driving scenario using a first value for each of a plurality of tunable parameters comprising a plurality of lateral dynamics parameters in a state weighting matrix of a linear quadratic regulator (LQR) of an ADV to control one or more controllers of the ADV, the plurality of tunable parameters also comprising a time constant parameter and an adaptive gain parameter for a model-referenced adaptive gain controller; and
        generating a score of the simulation of the driving scenario indicating performance of the one or more controllers during the simulation of the driving scenario;
    computing a first weighted score from the scores generated for the simulation of each of the plurality of driving scenarios; and
    optimizing the values of the plurality of tunable parameters by iteratively performing operations of running the simulation, generating the score, and computing the first weighted score, using the first weighted score for each repetition as an objective to generate a second value for each of the plurality of tunable parameters, wherein the optimized values for the plurality of tunable parameters are utilized by the one of more controllers of the ADV to navigate the ADV, and wherein the iterative operations are repeated until a second weighted score differs from the first weighted score of a previous iteration by less than a predetermined threshold amount or a predetermined fixed number of iterations has been performed.

2. The method of claim 1, wherein in a first iteration, the first value for each of the plurality of tunable parameters is selected randomly, and the optimizing is performed using a Bayesian Global Optimizer.

3. The method of claim 1, wherein the plurality of tunable parameters comprises:
    a low-speed and a high-speed proportional gain parameter;
    a low-speed and a high-speed integral gain parameter; and
    a station error parameter.

4. The method of claim 1, wherein the driving scenarios include:
    left turn at high speed;
    left turn at low speed;
    right turn at high speed;
    right turn at low speed;
    U-turn at high speed;
    U-turn at low speed; and
    serpentine-shape successive side-pass.

5. The method of claim 1, wherein generating the first weighted score and the second weighted score are each calculated using a weighting profile that includes:
    a weight for a heading error is higher than a weighting for speed error; and
    a weight for ending station error is higher than a weighting for ending lateral error.

6. The method of claim 1, wherein at least one of the one or more controllers are selected from the group consisting of a steering unit controller, a throttle unit controller, and a braking unit controller.

7. The method of claim 1, wherein the indicated performance of the one or more controllers during the simulation of the driving scenario is based on following a trajectory of an ADV route.

8. A non-transitory machine-readable medium having instructions stored therein, which when executed by a processor, cause the processor to perform operations, the operations comprising:
    for each of a plurality of driving scenarios:
        running a simulation of the driving scenario using a first value for each of a plurality of tunable parameters comprising a plurality of lateral dynamics parameters in a state weighting matrix of a linear quadratic regulator (LQR) of an ADV to control one or more controllers of the ADV, the plurality of tunable parameters also comprising a time constant parameter and an adaptive gain parameter for a model-referenced adaptive gain controller; and
        generating a score of the simulation of the driving scenario indicating performance of the one or more controllers during the simulation of the driving scenario;
    computing a first weighted score from the scores generated for the simulation of each of the plurality of driving scenarios; and
    optimizing the values of the plurality of tunable parameters by iteratively performing operations of running the simulation, generating the score, and computing the first weighted score, using the first weighted score for each repetition as an objective to generate a second value for each of the plurality of tunable parameters, wherein the optimized values for the plurality of tunable parameters are utilized by the one of more controllers of the ADV to navigate the ADV, and wherein the iterative operations are repeated until a second weighted score differs from the first weighted score of a previous iteration by less than a predetermined threshold amount or a predetermined fixed number of iterations has been performed.

9. The machine-readable medium of claim 8, wherein, in a first iteration of claim 8, the first value for each of the plurality of tunable parameters is selected randomly, and the optimizing is performed using a Bayesian Global Optimizer.

10. The machine-readable medium of claim 8, wherein the plurality of tunable parameters comprises:
    a low-speed and a high-speed proportional gain parameter;
    a low-speed and a high-speed integral gain parameter; and
    a station error parameter.

11. The machine-readable medium of claim 8, wherein the driving scenarios comprise:
left turn at high speed;
left turn at low speed;
right turn at high speed;
right turn at low speed;
U-turn at high speed;
U-turn at low speed; and;
serpentine-shape successive side-pass.

12. The machine-readable medium of claim 8, wherein generating the first weighted score and the second weighted score are each calculated using a weighting profile that includes:
a weight for a heading error is higher than a weighting for speed error; and
a weight for ending station error is higher than a weighting for ending lateral error.

13. The machine-readable medium of claim 8, wherein at least one of the one or more controllers are selected from the group consisting of a steering unit controller, a throttle unit controller, and a braking unit controller.

14. The machine-readable medium of claim 8, wherein the indicated performance of the one or more controllers during the simulation of the driving scenario is based on following a trajectory of an ADV route.

15. A data processing system, comprising:
a processor; and
a memory coupled to the processor to store instructions, which when executed by the processor, cause the processor to perform operations, the operations including:
for each of a plurality of driving scenarios:
running a simulation of the driving scenario using a first value for each of a plurality of tunable parameters comprising a plurality of lateral dynamics parameters in a state weighting matrix of a linear quadratic regulator (LQR) of an ADV to control one or more controllers of the ADV, the plurality of tunable parameters also comprising a time constant parameter and an adaptive gain parameter for a model-referenced adaptive gain controller; and
generating a score of the simulation of the driving scenario indicating performance of the one or more controllers during the simulation of the driving scenario;
computing a first weighted score from the scores generated for the simulation of each of the plurality of driving scenarios; and
optimizing the values of the plurality of tunable parameters by iteratively performing operations of running the simulation, generating the score, and computing the first weighted score, using the first weighted score for each repetition as an objective to generate a second value for each of the plurality of tunable parameters, wherein the optimized values for the plurality of tunable parameters are utilized by the one of more controllers of the ADV to navigate the ADV, and wherein the iterative operations are repeated until a second weighted score differs from the first weighted score of a previous iteration by less than a predetermined threshold amount or a predetermined fixed number of iterations has been performed.

16. The system of claim 15, wherein the first value for each of the plurality of tunable parameters is selected randomly, and the optimizing is performed using a Bayesian Global Optimizer.

17. The system of claim 15, wherein the plurality of tunable parameters comprises:
a low-speed and a high-speed proportional gain parameter;
a low-speed and a high-speed integral gain parameter; and
a station error parameter.

18. The system of claim 15, wherein the driving scenarios comprise:
left turn at high speed;
left turn at low speed;
right turn at high speed;
right turn at low speed;
U-turn at high speed;
U-turn at low speed; and;
serpentine-shape successive side-pass.

19. The system of claim 15, wherein at least one of the one or more controllers are selected from the group consisting of a steering unit controller, a throttle unit controller, and a braking unit controller.

20. The system of claim 15, wherein the indicated performance of the one or more controllers during the simulation of the driving scenario is based on following a trajectory of an ADV route.

* * * * *